US010294861B2

(12) United States Patent
Narine et al.

(10) Patent No.: US 10,294,861 B2
(45) Date of Patent: May 21, 2019

(54) COMPRESSED GAS ENERGY STORAGE SYSTEM

(71) Applicant: Trent University, Peterborough (CA)

(72) Inventors: Suresh S. Narine, Peterborough (CA); Michael Tessier, Toronto (CA)

(73) Assignee: Trent University, Peterborough (CA)

( * ) Notice: Subject to any disclaimer, the term of this patent is extended or adjusted under 35 U.S.C. 154(b) by 255 days.

(21) Appl. No.: 14/605,468

(22) Filed: Jan. 26, 2015

(65) Prior Publication Data

US 2016/0216044 A1 Jul. 28, 2016

(51) Int. Cl.

*F02C 1/04* (2006.01)
*F28D 20/02* (2006.01)
*F02C 6/16* (2006.01)
*F28D 20/00* (2006.01)

(52) U.S. Cl.

CPC .................. *F02C 1/04* (2013.01); *F02C 6/16* (2013.01); *F28D 20/00* (2013.01); *F28D 20/021* (2013.01); *F05D 2260/207* (2013.01); *F05D 2260/42* (2013.01); *Y02E 60/142* (2013.01); *Y02E 60/145* (2013.01); *Y02E 60/15* (2013.01)

(58) Field of Classification Search

CPC .. F28D 20/02; F02C 1/04; F15B 1/024; F15B 1/027
USPC .......................................... 60/650, 659, 682
See application file for complete search history.

(56) References Cited

U.S. PATENT DOCUMENTS 3,677,008 A 7/1972 Koutz
3,831,373 A 8/1974 Flynt
4,150,547 A 4/1979 Hobson
4,630,436 A 12/1986 Frutschi
4,765,142 A 8/1988 Nakhamkin (Continued)

FOREIGN PATENT DOCUMENTS

| | | |
|---|---|---|
| EP | 2 468 977 | 6/2012 |
| WO | 2013/070572 | 5/2013 |

OTHER PUBLICATIONS

Brown, Boveri & Cie, Huntorf Air Storage Gas Turbine Power Plan, Publication No. 3 GK 90202 E at https://www.eon.com/content/dam/eon-content-pool/eon/company-asset-finder/asset-profiles/shared-ekk/BBC_Huntorf_engl.pdf (available online at least by Jan. 13, 2015), 14 pages.

(Continued)

*Primary Examiner* — Hoang M Nguyen
(74) *Attorney, Agent, or Firm* — Bereskin & Parr LLP/S.E.N.C.R.L., s.r.l.; Michael Fenwick; Christopher Bury

(57) ABSTRACT

Compressed gas energy storage systems, which include an integrated thermal energy storage component, are provided. The systems include a compression stage, a heat transfer unit, and a gas storage reservoir, serially linked in fluid communication. The system may include one, two, or three compression stages and heat transfer units. Each heat transfer unit may include two or more thermal energy storage stages. Each thermal energy storage stage may include one or more phase change materials. A method of storing compressed gas energy, which includes compressing a gas through a compression stage to produce a compressed gas; passing the compressed gas through a heat transfer unit to produce a heat removed gas; and transferring the heat removed gas to a gas storage reservoir.

20 Claims, 16 Drawing Sheets

(56) References Cited

U.S. PATENT DOCUMENTS

| | | | | |
|---|---|---|---|---|
| 4,873,828 | A * | 10/1989 | Laing | F03D 9/001 114/256 |
| 5,495,709 | A | 3/1996 | Frutschi | |
| 5,497,629 | A | 3/1996 | Rafalovich et al. | |
| 5,778,675 | A * | 7/1998 | Nakhamkin | F02C 6/16 60/39.17 |
| 6,463,738 | B1 | 10/2002 | Pinkerton et al. | |
| 7,166,355 | B2 | 1/2007 | Jahns et al. | |
| 7,444,818 | B1 * | 11/2008 | Brostmeyer | F01K 3/12 60/682 |
| 7,802,426 | B2 | 9/2010 | Bollinger | |
| 7,832,207 | B2 | 11/2010 | McBride et al. | |
| 8,012,191 | B2 | 9/2011 | Von Hoffmann et al. | |
| 8,122,718 | B2 | 2/2012 | McBride et al. | |
| 8,539,763 | B2 | 9/2013 | McBride et al. | |
| 8,587,945 | B1 | 11/2013 | Hartmann et al. | |
| 8,763,390 | B2 | 7/2014 | Bollinger et al. | |
| 8,793,989 | B2 | 8/2014 | Fong et al. | |
| 8,795,717 | B2 | 8/2014 | Moen et al. | |
| 8,919,112 | B1 | 12/2014 | Fong et al. | |
| 9,612,059 | B2 | 4/2017 | Xiang et al. | |
| 2003/0131623 | A1 * | 7/2003 | Suppes | C09K 5/063 62/324.1 |
| 2005/0210878 | A1 | 9/2005 | Ashikian | |
| 2006/0213183 | A1 | 9/2006 | Althaus | |
| 2008/0022687 | A1 | 1/2008 | Althaus | |
| 2011/0094229 | A1 | 4/2011 | Freund et al. | |
| 2011/0108241 | A1 | 5/2011 | Driscoll et al. | |
| 2011/0120673 | A1 | 5/2011 | Xiang et al. | |
| 2011/0124769 | A1 | 5/2011 | Moen et al. | |
| 2011/0277956 | A1 | 11/2011 | Hermann et al. | |
| 2012/0018116 | A1 | 1/2012 | Mathur et al. | |
| 2012/0260656 | A1 | 10/2012 | Tseng et al. | |
| 2013/0105106 | A1 † | 5/2013 | Goswami et al. | |
| 2014/0238022 | A1 | 8/2014 | Damgen et al. | |
| 2015/0000248 | A1 | 1/2015 | del Omo | |

OTHER PUBLICATIONS

Bullough et al., Advanced Adiabatic Compressed Air Energy Storage for the Integration of Wind Energy, Conference Advanced Adiabatic Compressed Air Energy Storage for the Integration of Wind Energy, EWEC 2004, Nov. 22-25, 2004, London, UK, 8 pages.

Crotogino et al. Huntorf CAES: More than 20 Years of Successful Operation, Conference Huntorf CAES, 15-18 Apr. 2001, Orlando, FL, 7 pages.

Dalvi, Croygenic Energy Storage, available at http://large.stanford.edu/courses/2012/ph240/dalvi2/, Dec. 13, 2012, 3 pages.

Floros et al., Saturated linear diesters from stearic acid as renewable phase change materials, Materials Letters, vol. 137, 2014, pp. 252-255.

Grazzini et al., Thermodynamic analysis of CAES/TES systems for renewable energy plants, Renewable Energy 33(9), 2008, pp. 1998-2006.

Grazzini et al., A Thermodynamic Analysis of Multistage Adiabatic CAES, Proceedings of the IEEE 100(2), 2012, pp. 461-472.

Khare, Selection of materials for high temperature latent heat energy storage, Solar Energy Materials & Solar Cells, vol. 107, 2012, pp. 20-27.

Patel, The return of compressed air energy storage, Power 152(10), 2008, pp. 1-12.

Seller et al., Organic phase change materials and their textile applications: An overview, Thermochimica Acta, vol. 540, 2012, pp. 7-60.

Sharma et al., Review on thermal energy storage with phase change materials and applications, Renewable and Sustainable Energy Reviews, vol. 13, 2009, pp. 318-345.

Wolf et al., LTA-CAES—A low-temperature approach to Adiabatic Compressed Air Energy Storage, Applied Energy, vol. 125, 2014, pp. 158-164.

International Search Report and Written Opinion regarding International Application No. PCT/IB2016/050254, dated Mar. 15, 2016, 7 pages.

Geissbuhler et al., Experimental and Numerical Investigation of Combined Sensible/Latent Thermal Energy Storage for High-Temperature Applications, Chimia, 69 (12), 799-803 (2015).

RWE Power AG (2010). ADELE—Adiabatic compressed-air energy storage for electricity supply, 12 pps.

Sharma et al., Phase Change Materials for Low Temperature Solar Thermal Applications, Res. Rep. Fac. Eng. Mie Univ., vol. 29, pp. 31-64 (2004).

Zunft et al., Adiabatic compressed air energy storage for the grid integration of wind power, Sixth International Workshop on Large-Scale Integration of Wind Power and Transmission Networks for Offshore Windfarms, Oct. 26-28, 2006, Delft, the Netherlands, 6 pps.

Koray Taslankaya, Development of a Methodology for Sizing and Assessment of Wind Integrated Advanced Adiabatic Compressed Air Energy Storage System (AA-CAES.†

Ming Fang et al., "Effects of different multiple PCMs on the performance of a latent thermal energy storage system", pp. 994-1000, Oct. 13, 2006, Elsevier ScienceDirect, Online.†

Zhen-Xiang Gong et al., "Thermodynamic Optimization of the Thermal Process in Energy Storage Using Multiple Phase Change Materials". pp. 1067-1083, 1997. Pergamon, Great Britain.†

Adriano Milazzo, "Optimization of the configuration in a CAES-TES system", pp. 1-12, 2008, 1st International Workshop "Shape and Thermodynamics", Florence IT.†

Harald Mehling et al. "Heat and cold storage with PCM: An up to date introduction into basics and applications", Figure 6.7, 2008, Spinger-Verlag Berlin Heidelberg.†

Mohammed M. Farid et al., "Thermal Performance of a Heat Storage Module Using PCM's, With Different Melting Temperatures' Experimental", pp. 125-131, May 1990, Journal of Solar Energy Engineering.†

Robert Pitz-Paal et al., "Cascaded latent heat storage for parabolic trough solar power plants", pp. 829-837, Nov. 3, 2006, Elsevier ScienceDirect.†

* cited by examiner
† cited by third party

5(a)

5(b)

7(a)

7(b)

7(c)

11(c)

13(a)

13(b)

14(a)

14(b)

15(a)

15(b)

16(a)

16(b)

COMPRESSED GAS ENERGY STORAGE SYSTEM

BACKGROUND

The global supply of renewable energy is rapidly increasing due to increases in generating facilities, such as those from wind and solar. The inherent instability of renewable energy sources, however, currently places a practical restriction such that only a maximum of 15-20% of a grid's power is projected to be derived from these sources. This limitation could potentially be alleviated or even eliminated by integrating electrical energy storage (EES) technologies into the grid. Electrical energy storage technologies are highly desired for both their environmental and economic benefits, as EES would allow increased utilization of existing power plants in addition to introducing possibilities of energy arbitrage.

Of the existing EES technologies, pumped hydro storage has the largest installed storage capacity globally, estimated at over 130 gigawatts. Geographical (limited number of candidate sites) and ecological (concerns with dams causing habitat destruction) considerations will likely limit future development of pumped hydro storage. The only other grid energy storage technology with similar performance to pumped hydro storage is compressed air energy storage (CAES). CAES was originally developed in the early 1960s and stores energy in the elastic potential energy of compressed air. With the demand for energy storage technologies following the rapid increase in deployment of renewable energy sources, there has been renewed interest in CAES. However, a significant technical issue with CAES is that when the air is compressed approximately half of the exergy created is in the form of heat. This heat energy is energy that can be lost if not properly stored.

To reduce the heat loss, different proposals have been advanced in the literature which propose to store thermal energy using various heat storage materials. This concept of storing thermal energy in a heat storage material is known as adiabatic compressed air energy storage. Literature reports have concluded phase change materials (PCMs) are not a viable candidate for use as a thermal energy storage material for compressed air energy storage systems based on assessments that "no single (PCM) system can cover the (large temperature) range" required by such a system. See, e.g., Bullough et al., "Advanced Adiabatic Compressed Air Energy Storage for the Integration of Wind Energy," Conference Advanced Adiabatic Compressed Air Energy Storage for the Integration of Wind Energy, London, UK (2004).

SUMMARY

The present application relates generally to compressed gas energy storage systems which include an integrated thermal energy storage component. The compressed gas energy storage system may include a compression stage, a heat transfer unit, and a gas storage reservoir, serially linked in fluid communication. The heat transfer unit may include two or more thermal energy storage stages (TESs), where each of the TESs has a thermal energy transfer temperature (TETT) that is lower than a TETT of the adjacent upstream TES of the heat transfer unit. In some embodiments, each TES includes a phase change material (PCM). The system may also include a first expansion stage in fluid communication with the heat transfer unit. In some embodiments, the heat transfer unit may have a gas inlet which includes an inlet control valve for either (a) allowing gas inflow from the compression stage or (b) allowing gas outflow to the expansion stage. In many instances, the expansion stage may include a gas turbine. In a number of embodiments, at least one of the thermal energy storage stages includes a phase change material (PCM) in thermal contact with a fluid conduit passing through the TES; where the fluid conduit is in fluid communication with a gas inlet and a gas outlet of the heat transfer unit. In the present systems, the gas storage reservoir may be a compressed gas storage reservoir or, in some instances, a liquefied gas (e.g., liquid air or liquid nitrogen) storage reservoir. In some embodiments, the present system utilizes compressed air. Such systems are referred to as compressed air energy storage (CAES) systems.

Another embodiment of the present system includes the following components serially linked in fluid communication: a first compression stage (C-1); a first heat transfer unit (HTU-1), which includes one or more thermal energy storage stages (TESs), where at least one of the thermal energy storage stages includes a phase change material (PCM); a second compression stage (C-2); a second heat transfer unit (HTU-2); and a gas storage reservoir. In some embodiments, the HTU-2 also includes one or more thermal energy storage stages (TESs), where at least one of the thermal energy storage stages includes a phase change material (PCM). The phase change material may optionally be suspended/dispersed in a heat transfer fluid. In such embodiments, the phase change material may be in encapsulated form. The heat transfer units HTU-1 and HTU-2 may be the same heat transfer unit. In other embodiments, the heat transfer units HTU-1 and HTU-2 may be different heat transfer units.

Other embodiments of the present system include a first compression stage (C-1) in fluid communication with a first heat transfer unit (HTU-1); and a gas storage reservoir in fluid communication with the HTU-1. In some embodiments, the C-1 may be in fluid communication with the gas inlet of the first heat transfer unit (HTU-1); and the gas storage reservoir may be in fluid communication with the gas outlet of the HTU-1. The HTU-1 typically includes at least two thermal energy storage stages (TESs) serially linked in fluid communication between the gas inlet and gas outlet. Each of the thermal energy storage stages may include a phase change material (PCM). The PCM in each of the thermal energy storage stages commonly has a melting point which is lower than a melting point of the PCM in the adjacent upstream TES of the HTU-1. The system may also include an expansion stage in fluid communication with the gas inlet of the HTU-1. Quite commonly the HTU-1 gas inlet includes an inlet control valve for either (a) allowing gas inflow from the C-1 or (b) allowing gas outflow to the first expansion stage.

Other embodiments of the present system may include the following components serially linked in fluid communication: a first compression stage (C-1), a first heat transfer unit (HTU-1); and a gas storage reservoir. In some embodiments, the gas storage reservoir may be in fluid communication with a gas outlet of the HTU-1. The HTU-1 typically includes at least one thermal energy storage stage which contains a phase change material ("PCM stage"). The HTU-1 may include two or more PCM stages. In such systems, each of the PCM stages commonly includes a phase transfer material (PCM) having a melting point which is lower than the melting point of the PCM in the adjacent upstream PCM stage. As used herein, "upstream" and "downstream" are defined with respect to the direction of gas flow from the first compression stage (C-1) through the heat transfer unit to the gas storage reservoir.

In other embodiments, the present system may include a first compression unit (C-1) in fluid communication with a first heat transfer unit (HTU-1); a second compression unit (C-2) in fluid communication with the HTU-1, a second heat transfer unit (HTU-2) in fluid communication with the C-2, and a gas storage reservoir (GSR) in fluid communication with the HTU-2. In another embodiment, the system may include a third compression stage (C-3) and third heat transfer unit (HTU-3) serially linked in fluid communication between the HTU-2 and the GSR. The HTU-3 is commonly positioned between the C-3 and the GSR.

Another embodiment of the present system may include a first compression stage (C-1) having an outlet in fluid communication with the first gas inlet of a first heat transfer unit (HTU-1); a second compression stage (C-2) having an inlet in fluid communication with the first gas outlet of the HTU-1 and an outlet in fluid communication with a second gas inlet of the HTU-1; and a gas storage reservoir in fluid communication with a second gas outlet of the HTU-1. The first gas inlet and the first gas outlet of the HTU-1 may be connected by a first fluid conduit; and the second gas inlet and the second gas outlet of the HTU-1 may be connected by a second fluid conduit.

In other embodiments, the present system may include sequentially positioned in fluid communication: a first compression stage (C-1); a first heat transfer unit (HTU-1) comprising at least one PCM stage; a second compression stage (C-2); a second heat transfer unit (HTU-2) comprising at least one PCM stage; and a gas storage reservoir. The gas storage reservoir may be a compressed gas storage reservoir or a liquefied gas storage reservoir. In some aspects, the first and second heat transfer units HTU-1 and HTU-2 may be the same heat transfer unit.

Another embodiment of the present system includes sequentially positioned in fluid communication:

a first compression stage (C-1);

a first heat transfer unit (HTU-1) comprising at least one PCM stage;

a second compression stage (C-2);

a second heat transfer unit (HTU-2) comprising at least one PCM stage;

a third compression stage (C-3);

a third heat transfer unit (HTU-3) comprising at least one PCM stage; and a gas storage reservoir.

Such a system may also include a final heat transfer unit positioned in fluid communication with the third heat transfer unit (HTU-3) and the gas storage reservoir. In many instances, the HTU-1, the HTU-2 and the HTU-3 each comprise at least two PCM stages. Typically, each of the PCM stages comprise a phase transfer material (PCM) having a melting point which is lower than a melting point of a PCM in an adjacent upstream PCM stage. The system may also include a first expansion stage (T-1) positioned in fluid communication between the second heat transfer unit (HTU-2) and the first heat transfer unit (HTU-1); a second expansion stage (T-2) positioned in fluid communication between the third heat transfer unit (HTU-2) and the second heat transfer unit (HTU-2); and a third expansion stage (T-2) positioned in fluid communication between the gas storage reservoir and the third heat transfer unit (HTU-3).

Another embodiment provides a method of storing compressed gas energy including (a) compressing a gas through a first compression stage (C-1) to produce a first compressed gas; (b) passing the first compressed gas through a first heat transfer unit (HTU-1) to produce a first heat removed gas; and (c) transferring the first heat removed gas to a gas storage reservoir (GSR) to produce a stored compressed gas. In some instances, as part of step (c) the method may include liquefying the first heat removed gas and transferring the liquefied gas to the gas storage reservoir. In such systems, the gas storage reservoir is a liquefied gas storage reservoir. In some embodiments, the HTU-1 includes at least two thermal energy storage stages (TESs) serially linked in fluid communication between a gas inlet and a gas outlet of the HTU-1; each of the TESs has a thermal energy transfer temperature (TETT) which is lower than a TETT of an adjacent upstream TES of the HTU-1; and passing the first compressed gas through the HTU-1 in step (b) includes sequentially passing the first compressed gas through at least two TESs. In some embodiments, the method may include (d) passing the stored gas from the GSR through the first heat transfer unit (HTU-1) to produce a first heat added gas; and (e) expanding the first heat added gas through a first expansion stage (T-1) to produce a first expanded gas. Passing the first expanded gas through the HTU-1 may include sequentially passing the first expanded gas through the at least two TESs in a direction which is the reverse of the passage of the first compressed gas in step (b).

The present system also includes a method of storing compressed gas energy which includes (a) compressing a gas through a first compression stage (C-1) to produce a first compressed gas; (b) passing the first compressed gas through a first heat transfer unit (HTU-1) to produce a first heat removed gas; (c) compressing the first heat removed gas through a second compression stage (C-2) to produce a second compressed gas; (d) passing the second compressed gas through a second heat transfer unit (HTU-2) to produce a second heat removed gas; and (e) transferring the second heat removed gas to a gas storage reservoir (GSR) to produce a stored compressed gas. In some embodiments, each of the heat transfer units include at least one thermal energy storage stage (PCM Stage) that includes a phase change material (PCM), where the PCM is in thermal contact with a fluid conduit passing through the PCM Stage.

As described above, in some embodiments the present system may convert the input gas into a liquefied gas, such as liquid air or liquid nitrogen. In such systems, the gas storage reservoir is a liquefied gas storage reservoir in which the gas is stored at low pressure but at a temperature substantially below ambient temperature (typically about −196 C where the gas is liquid air or liquid nitrogen). Such a storage unit may include a vacuum jacketed storage tank as the storage reservoir. Such systems also commonly include a gas liquefaction unit (e.g., air liquefaction unit) positioned in fluid communication between the first heat transfer unit (HTU-1) and the gas storage reservoir. The gas liquefaction unit may be a Linde cycle gas liquefier unit.

DETAILED DESCRIPTION

The present disclosure provides compressed gas energy storage systems which include an integrated thermal energy storage component. In one aspect, the compressed gas energy storage system includes serially linked in fluid communication: a first compression stage (C-1); a first heat transfer unit (HTU-1), which includes at least two thermal energy storage stages (TESs), each of the TESs having a thermal energy transfer temperature (TETT) which is lower than a TETT of an adjacent upstream TES of the HTU-1; and a gas storage reservoir. In some embodiments, the system may further include a first expansion stage (T-1) in fluid communication with the HTU-1. In many instances, the first expansion stage (T-1) may include a gas turbine or other device(s) for converting compressed gas energy into mechanical and/or electrical energy.

Figure 1:
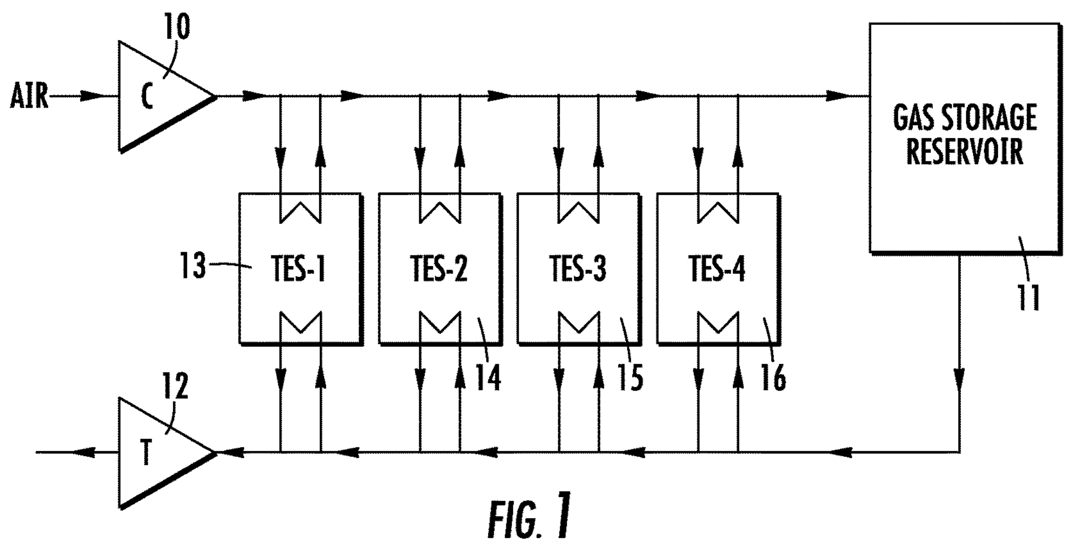
FIG. 1: depicts a schematic representation of one embodiment of a compressed air energy storage (CAES) system, which includes four thermal energy storage stages in a heat transfer unit.

FIG. 1 is a schematic representation illustrating one embodiment of a compressed air energy storage (CAES) system according to the present application. The system includes a compression stage 10 in fluid communication with a gas storage reservoir 11. The system also includes an expansion stage 12, which may include a gas turbine, in fluid communication with a gas storage reservoir 11. The system also includes four thermal energy storage stages 13, 14, 15, 16 serially linked in fluid communication between the compression stage 10 and the gas storage reservoir 11.

As used herein, the terms "upstream" and "downstream" are defined with respect to the direction of gas flow from a compression stage through a heat transfer unit to a gas storage reservoir. An upstream TES of a heat transfer unit will have a higher TETT compared to an adjacent downstream TES.

In the present system, a heat transfer unit (HTU) includes one or more thermal energy storage stages (TESs). In some embodiments the HTU includes two or more TESs (i.e., a cascade of TESs). Each TES has a thermal energy transfer temperature (TETT). The upstream TES has a higher TETT compared to an adjacent downstream TES of the same HTU. In some embodiments, the HTU may include one, two, or three TESs. An HTU with a cascade of two TESs may include a first TES (i.e., upstream TES) with the highest melting temperature and a second TES (i.e., downstream TES) with the lowest melting temperature. An HTU with a cascade of three TESs may include a first TES (i.e., upstream TES) with the highest melting temperature; a second TES (i.e., midstream TES) with a melting temperature between the first and third TESs; and a third TES (i.e., downstream TES) with the lowest melting temperature. In some embodiments the present system may include one, two, or three heat transfer units (HTUs) each with one, two, or three thermal energy storage stages (TESs). The present system typically includes two or three HTUs with a cascade of at least two TESs. Commonly, the present system includes two or three HTUs with a cascade of two or three TESs. In some embodiments, a heat transfer unit may have a gas inlet, which includes an inlet control valve for either (a) allowing gas inflow from a compression stage or (b) allowing gas outflow to an expansion stage.

In some embodiments, at least one of the TESs includes one or more phase change materials (PCM). In a number of embodiments, at least one of the thermal energy storage stages includes a PCM that is in thermal contact with a fluid conduit passing through the TES; where the fluid conduit is in fluid communication with a gas inlet and a gas outlet of the heat transfer unit. As used herein the term "phase change material" (PCM) refers to a substance with a high heat of fusion that melts and solidifies over a narrow temperature and is capable of storing and releasing large amounts of energy. Heat is absorbed or released when the PCM changes from solid to liquid and vice versa. Suitable PCMs may include those disclosed in Sharma, et. al., "Review of thermal energy storage with phase change materials and applications," Renewable and Sustainable Energy Reviews, 13:318-345 (2009) and Sarier, et. al., "Organic phase change materials and their textile applications: An overview," Thermochimica Acta, 540:7-60 (2012) (incorporated herein by reference). Suitable PCMs include organic and inorganic PCMs with melting temperatures below about 500 K. Suitable organic PCMs include both paraffin and non-paraffin PCMs such as paraffin waxes, poly(ethylene glycol)s, fatty acids and fatty acid derivatives, and polyalcohols and polyalcohol derivatives. Suitable inorganic PCMs include both salt hydrates and/or metals. Suitable PCMs may also include eutectic PCMs.

In addition to heat storage units with one or more TESs, the system may also include one or more sensible heat storage units (i.e., units with heat storage materials which do not undergo a phase change in the temperature range of the storage process), e.g., as a final heat storage/transfer unit interposed between TES-4 and the gas storage reservoir in the system depicted in FIG. 1. This final heat storage/transfer unit may be designed to cool the compressed gas to ambient temperature, e.g., using water as the sensible heat storage fluid. Sensible heat storage materials are materials, typically in a fluid state which do not undergo a phase change within the operating temperature range where the material is employed as an energy storage/transfer medium, i.e., heat storage material does not transfer any latent heat within the operating temperature range in which it is employed.

In the present system, the gas storage reservoir (GSR) may be in fluid communication with a heat transfer unit. In some embodiments, the gas storage reservoir may include a gas inlet. The gas inlet may include a control valve for either (a) allowing gas inflow from a heat transfer unit and/or (b) allowing gas outflow to a heat transfer unit. In some embodiments, the GSR may include a separate gas inlet and gas outlet.

In some embodiments, the system may include a second compression stage (C-2) and second heat transfer unit (HTU-2) serially linked in fluid communication between the HTU-1 and the gas storage reservoir. Commonly, the HTU-2 is positioned between the second compression stage and the gas storage reservoir. The system may also include a second expansion stage in fluid communication with the HTU-2 and HTU-1. In some embodiments, the HTU-1 and HTU-2 are the same heat transfer unit.

Figure 2:
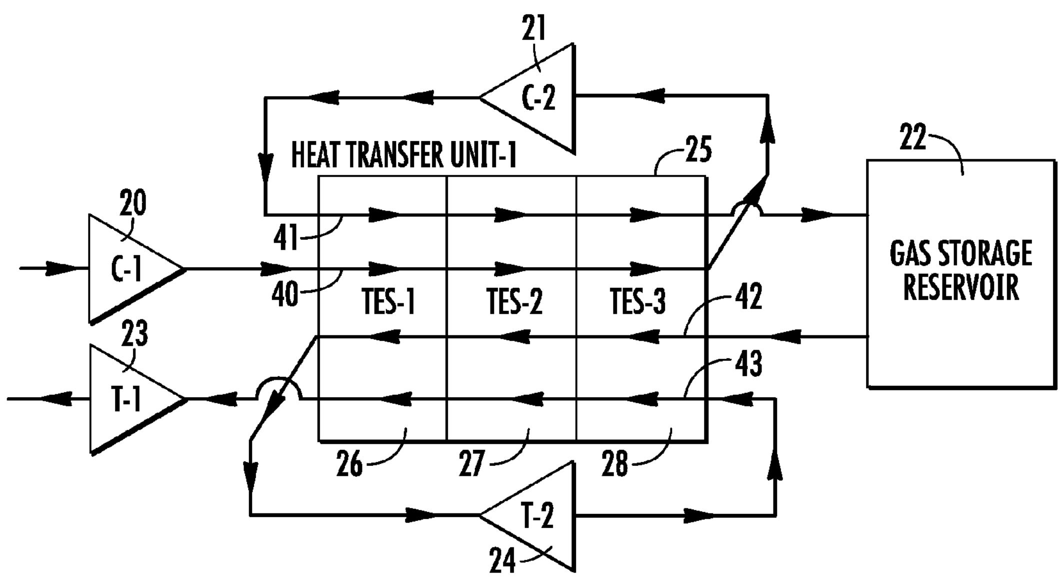
FIG. 2: depicts a schematic representation of an embodiment of a multi-thermal energy storage stage (TESs) CAES system including two compression units and a single heat transfer unit connected to a gas storage reservoir (GSR).
Figure 3:
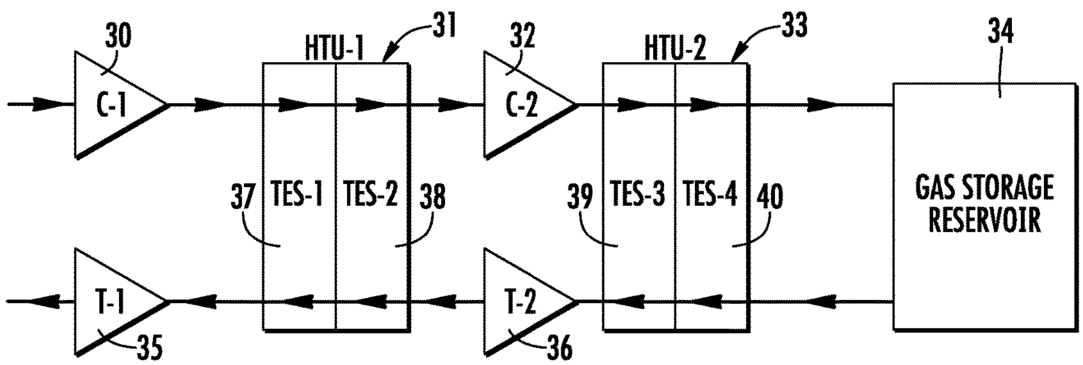
FIG. 3: depicts a schematic representation of an embodiment of a multi-thermal energy storage stage (TESs) CAES system including two compression units and two separate heat transfer units connected in series with a gas storage reservoir (GSR).

FIGS. 2 and 3 illustrate additional embodiments of the present system which include a series of compression stages with each stage being followed by a heat transfer unit. In some embodiments, the heat transfer units may be the same heat transfer unit (see, e.g., FIG. 2). In another embodiment, the heat transfer units may be separate heat transfer units (see, e.g., FIG. 3).

In the embodiment schematically illustrated in FIG. 2, the system includes two compression stages 20, 21, heat transfer unit 25, two expansion stages 23, 24 and a gas storage reservoir 22. The first compression stage 20 is in fluid communication with a first fluid conduit 40 passing through the heat transfer unit 25. The first fluid conduit 40 is also in fluid communication with the second compression stage 21. The second compression stage 21 is in fluid communication with a second fluid conduit 41, which also passes through the heat transfer unit 25. The second fluid conduit 41 is in fluid communication with the gas storage reservoir 22. The heat transfer unit 25 includes three thermal energy storage stages 26, 27, 28 serially linked in fluid communication. The thermal energy storage stages 26, 27, 28 are in thermal contact with the first fluid conduit 40 and the second fluid conduit 41. The heat transfer unit 25 also includes third fluid conduit 42, which is in fluid communication with the gas storage reservoir 22 and the second expansion stage 24. The second expansion stage 24 is in fluid communication with a fourth fluid conduit 43 passing through the heat transfer unit 25 and the first second expansion stage 23.

In the embodiment of the present system schematically illustrated in FIG. 3, the system includes alternating series of compression stages and heat transfer units serially linked in fluid communication. The first compression stage 30 is in fluid communication with a first heat transfer unit 30, which includes two serially linked thermal energy storage stages 37, 38. A second compression stage 32 is positioned downstream of and in fluid communication with the first heat transfer unit 30. The second compression stage 32 is also in fluid communication with a second heat transfer unit 33, which is in fluid communication with a gas storage reservoir 34. The second heat transfer unit 32, which includes two serially linked thermal energy storage stages 39, 40. A fluid path also serially connects the gas storage reservoir 34 with the second heat transfer unit 33 and a second expansion stage 36. The second expansion stage 36 is positioned in between and in fluid communication with the second heat transfer unit 33 and the first heat transfer unit 31. The system also includes a first expansion stage 35 in fluid communication the first heat transfer unit 31.

The present system may include serially linked in fluid communication between the HTU-1 and the gas storage reservoir: a second compression stage (C-2); a second heat transfer unit (HTU-2); a third compression stage (C-3); and a third heat transfer unit (HTU-3). The second expansion stage may be in fluid communication with the HTU-2 and the HTU-1; and the third expansion stage may be in fluid communication with the HTU-3 and the HTU-2.

In some embodiments of the system, the first compression stage (C-1) is in fluid communication with a gas inlet of the first heat transfer unit (HTU-1); and the gas storage reservoir (GSR) is in fluid communication with a gas outlet of the HTU-1. Each of the thermal energy storage stages may include a PCM and the PCM in each of the thermal energy storage stages may have a melting point which is lower than a melting point of the PCM in an adjacent upstream TES of the HTU-1.

In another embodiment, the system includes sequentially positioned in fluid communication between the first heat transfer unit (HTU-1) and the gas storage reservoir (GSR): a second compression stage (C-2); a second heat transfer unit (HTU-2) that includes at least one PCM stage; a third compression stage (C-3); and a third heat transfer unit (HTU-3) that includes at least one PCM stage.

The present system may include three heat transfer units. The HTU-1, the HTU-2, and the HTU-3 may each include at least two PCM stages. Each of the PCM stages may include a phase transfer material (PCM) having a melting point which is lower than a melting point of a PCM in an adjacent upstream PCM stage.

In the present system, each compression stage includes a compressor that compresses the gas with a compression ratio of about 3 to 100. In some embodiments, the compression ratio may be about 3 to 20, about 7 to 15, or about 10-14. In some embodiments, the compression ratio may be about 3 to 20, about 3 to 10, or about 4 to 7. Commonly, the compression ratio may be about 5 to 6 or about 12 to 14. The maximum total compression ratio for the present system may be about 50 to 300, more commonly about 100 to 250. In some embodiments, the present system may include two, three, or more compression stages. The present system typically includes two or three compression stages. In some embodiments, systems that include two or more compression stages may have a different compression ratio at each compression stage. In other embodiments, systems that include two or more compression stages may have approximately the same compression ratio at each compression stage, e.g., a system with three compression stages and a maximum total compression ratio of about 100-200 may have a compression ratio of about 5 to 6 at each compression stage. In systems with two compression stages and a maximum total compression ratio of about 100-200, the compression ratio of each individual compression stage may be about 10 to 15.

In one embodiment, the present system contains two compression stages. In such systems, the maximum total compression ratio may be about 50 to 250. Each of the compression stages typically has a compression ratio of about 3 to 20, about 5 to 15 and more commonly about 8 to 15 or 10 to 14. It may be advantageous to design the system such that each of the compression stages has roughly the same compression ratio, since such designs will generally result in systems having the lowest maximum temperature of compressed gas entering a heat transfer unit (HTU). In a system with two compression stages, there may be two heat transfer units each having a cascade of two PCM thermal energy storage stages (PCM Stages). Such systems may include at least one compression stage which has a compression ratio of about 8 to 15, more commonly about 10-14. For example, if at least one of the compression stages may have a compression ratio of about 8 to 15, the adjacent downstream heat transfer unit may contain two thermal energy storage stages—an upstream TES and a downstream TES serially linked in fluid communication between the gas inlet and gas outlet of the HTU. The upstream TES may include a PCM having a melting point of about 410 to 460 K; and the downstream TES may include a PCM having a melting point of about 360 to 390 K. In some systems, both of the compression stages and heat transfer units may have such characteristics.

In one embodiment, the present system contains three compression stages. In such systems, the maximum total compression ratio may be about 50 to 250. Each of the compression stages typically has a compression ratio of about 3 to 20, about 3 to 10 and more commonly about 4 to 7 or 5 to 6. It may be advantageous to design the system such that each of the compression stages has roughly the same compression ratio, since such designs will generally result in systems having the lowest maximum temperature of compressed gas entering a heat transfer unit (HTU). In a system with three compression stages, there may be three heat transfer units each having at least cascade of two PCM thermal energy storage stages (PCM Stages). Such systems may include at least one compression stage which has a compression ratio of about 3 to 10, more commonly about 4 to 7. For example, if at least one of the compression stages may have a compression ratio of about 3 to 10, the adjacent downstream heat transfer unit may contain two thermal energy storage stages—an upstream TES and a downstream TES serially linked in fluid communication between the gas inlet and gas outlet of the HTU. The upstream TES may include a PCM having a melting point of about 360 to 390 K; and the downstream TES may include a PCM having a melting point of about 330 to 350 K. In some systems, both of the compression stages and heat transfer units may have such characteristics.

In another embodiment, the present system contains two compression stages. In such systems, the maximum total compression ratio may be about 50 to 250. Each of the compression stages typically has a compression ratio of about 3 to 20, about 5 to 15 and more commonly about 8 to 15 or 10 to 14. It may be advantageous to design the system such that each of the compression stages has roughly the same compression ratio, since such designs will generally result in systems having the lowest maximum temperature of compressed gas entering a heat transfer unit (HTU). In a system with two compression stages, there may be two heat transfer units each having at least cascade of three PCM thermal energy storage stages (PCM Stages). Such systems may include at least one compression stage which has a compression ratio of about 8 to 15, more commonly about 10-14. For example, if at least one of the compression stages may have a compression ratio of about 8 to 15, the adjacent downstream heat transfer unit may contain three thermal energy storage stages—an upstream TES, a middle TES, and a downstream TES serially linked in fluid communication between the gas inlet and gas outlet of the HTU. The upstream TES may include a PCM having a melting point of about 430 to 490 K; the middle TES may include a PCM having a melting point of about 390 to 420 K; and the downstream TES may include a PCM having a melting point of about 340 to 370 K. In some systems, both of the compression stages and heat transfer units may have such characteristics.

In one embodiment, the present system contains three compression stages. In such systems, the maximum total compression ratio may be about 50 to 250. Each of the compression stages typically has a compression ratio of about 3 to 20, about 3 to 10 and more commonly about 4 to 7 or 5 to 6. It may be advantageous to design the system such that each of the compression stages has roughly the same compression ratio, since such designs will generally result in systems having the lowest maximum temperature of compressed gas entering a heat transfer unit (HTU). In a system with three compression stages, there may be three heat transfer units each having at least cascade of three PCM thermal energy storage stages (PCM Stages). Such systems may include at least one compression stage which has a compression ratio of about 3 to 10, more commonly about 4 to 7. For example, if at least one of the compression stages may have a compression ratio of about 3 to 10, the adjacent downstream heat transfer unit may contain three thermal energy storage stages—an upstream TES, a middle TES, and a downstream TES serially linked in fluid communication between the gas inlet and gas outlet of the HTU. The upstream TES may include a PCM having a melting point of about 375 to 410 K; the middle TES may include a PCM having a melting point of about 345 to 370 K; and the downstream TES may include a PCM having a melting point of about 310 to 340 K. In some systems, both of the compression stages and heat transfer units may have such characteristics.

The present system may also include an expansion stage. In some embodiments, the present system may include two, three, or more expansion stages. Each expansion stage may expand the gas, which in turn may drive a piston or hydraulic liquid, sending power that can be harvested as mechanical power from the system. The mechanical power may be converted to or from electrical power using a conventional motor-generator. In many instances, the expansion stage may include a gas turbine or other device(s) for converting compressed gas energy into mechanical and/or electrical energy. In some embodiments, a first expansion stage is in fluid communication with a heat transfer unit.

In some embodiments, the present system may include a first expansion stage (T-1) positioned in fluid communication with the first heat transfer unit (HTU-1); a second expansion stage (T-2) positioned in fluid communication between the second heat transfer unit (HTU-2) and the first heat transfer unit (HTU-1); and a third expansion stage (T-3) positioned in fluid communication between the third heat transfer unit (HTU-3) and the second heat transfer unit (HTU-2).

In one aspect, the present system includes a method of storing compressed gas energy including (a) compressing a gas through a first compression stage (C-1) to produce a first compressed gas; (b) passing the first compressed gas through a first heat transfer unit (HTU-1) to produce a first heat removed gas; and (c) transferring the first heat removed gas to a gas storage reservoir (GSR) to produce a stored compressed gas. In some embodiments, the HTU-1 includes at least two thermal energy storage stages (TESs) serially linked in fluid communication between a gas inlet and a gas outlet of the HTU-1; each of the TESs has a thermal energy transfer temperature (TETT) which is lower than a TETT of an adjacent upstream TES of the HTU-1; and passing the first compressed gas through the HTU-1 in step (b) includes sequentially passing the first compressed gas through at least two TESs. In some embodiments, the method may also include (d) passing the stored gas from the GSR through the first heat transfer unit (HTU-1) to produce a first heat added gas; and (e) expanding the first heat added gas through a first expansion stage (T-1) to produce a first expanded gas. Passing the first expanded gas through the HTU-1 may include sequentially passing the first expanded gas through the at least two TESs in a direction which is the reverse of the passage of the first compressed gas in step (b).

The present system may also include a method of storing compressed gas energy which includes (a) compressing a gas through a first compression stage (C-1) to produce a first compressed gas; (b) passing the first compressed gas through a first heat transfer unit (HTU-1) to produce a first heat removed gas; (c) compressing the first heat removed gas through a second compression stage (C-2) to produce a second compressed gas; (d) passing the second compressed gas through a second heat transfer unit (HTU-2) to produce a second heat removed gas; and (e) transferring the second heat removed gas to a gas storage reservoir (GSR) to produce a stored compressed gas. In some embodiments, each of the heat transfer units include at least one thermal energy storage stage that includes at least a phase change material (i.e., PCM stage), where the PCM is in thermal contact with a fluid conduit passing through the PCM Stage.

In one aspect of the present system is provided a system including: a first compression stage (C-1) having an outlet in fluid communication with a first gas inlet of a first heat transfer unit (HTU-1); a second compression stage (C-2) having an inlet in fluid communication with a first gas outlet of the HTU-1 and an outlet in fluid communication with a second gas inlet of the HTU-1; and a gas storage reservoir (GSR) in fluid communication with a second gas outlet of the HTU-1. In one embodiment, the first gas inlet and the first gas outlet of the HTU-1 are connected by a first fluid conduit; and the second gas inlet and the second gas outlet of the HTU-1 are connected by a second fluid conduit. Commonly, the heat transfer unit includes at least one PCM stage, where the PCM is in thermal contact with the first and second fluid conduits. In some embodiments, the heat transfer unit may include at least two PCM stages; and each of the PCM stages may include a phase transfer material (PCM) having a melting point which is lower than a melting point of the PCM in an adjacent upstream PCM stage.

In another aspect of the present system is provided a compressed gas energy storage system comprising sequentially positioned in fluid communication: a first compression stage (C-1); a first heat transfer unit (HTU-1) including at least one PCM stage; a second compression stage (C-2); a second heat transfer unit (HTU-2) including at least one PCM stage; and a gas storage reservoir (GSR). In some embodiments, the system may include a first expansion stage (T-1) positioned in fluid communication with the first heat transfer unit (HTU-1); and a second expansion stage (T-2) positioned in fluid communication with the first heat transfer unit (HTU-1) and the second heat transfer unit (HTU-2).

In some embodiments, the system may have a first compression stage followed by a first thermal energy unit, e.g., where the thermal energy unit may have two, three, or four thermal energy storage stages (see FIG. 1). Each thermal energy storage stage may include a PCM (i.e., a PCM stage). PCM(s) of the PCM stages are assumed to operate isothermally and gas is heated and cooled through the stages isobarically. The gas passes through the thermal energy storage stages of the heat transfer unit of decreasing heat transfer temperatures (e.g., by sequentially passing through thermal energy storage stages with PCMs having decreasing melting points) following compression. When gas is passed through the heat transfer unit in the reverse direction prior to expansion, the thermal energy storage stages will have increasing heat transfer temperatures. During compression, gas will only pass through a heat transfer unit if the gas is at a temperature greater than the melting temperature of the thermal energy storage stages. The gas leaves the gas storage reservoir at ambient temperature and will then only pass through a heat transfer unit if the stages have remaining latent heat prior to expansion.

In some embodiments, the system may provide advantages due to heat exchanges in increments. This occurs through the cooling/heating gas in stages, which generates less entropy and improvement of the roundtrip exergy efficiency. Additionally, when employing PCMs in the thermal energy storage stages, the stages will have a higher energy density than other sensible heat storage approaches (such as heat exchange materials which remain fluid under operating conditions), and therefore material and volume storage requirements are lower.

While not intended to limit the scope of the present invention, the following calculations and discussion are believed to provide a framework and understanding for the design of the compressed gas energy storage systems described herein. The temperature of the gas, assumed to be an ideal gas for the sake of the calculations, leaving the compressor and expander, $T_2$, is assumed to compress and expand according to a reversible adiabatic process, and so is dependent on the input temperature, $T_1$, as well as the ratio of the input and output pressures, $p_1$ and $p_2$, respectively.

$$T_2 = T_1\left(\frac{p_2}{p_1}\right)^{\frac{\gamma-1}{\gamma}} \tag{1}$$

The value of the polytropic exponent, y, is fixed to 1.45 for compression and 1.36 for expansion. For simpler notation, the ratio of pressure to ambient pressure, $p_0$, is taken to be β.

$$\beta = \frac{p_1}{p_0} \tag{2}$$

The rate of change of the compression ratio with respect to time, t, can be derived from the ideal gas law and is dependent on parameters such as the gas constant, R, specific heat capacity, $c_v$, gas storage reservoir volume, V, and compressor/expander power, P.

$$\frac{d\beta}{dt} = \frac{PR}{c_v p_0 V\left(\beta^{\frac{r-1}{r}} - 1\right)} \tag{3}$$

The compression ratio is varied from 1 to a maximum total compression ratio in all calculations. While in practice the minimum compression ratio is significantly greater than one, this approach allows for consistency in calculations when varying the maximum total compression ratio.

The gas mass flow rate, ṁ, is varied in order to maintain constant power from the compressor and expander, and is dependent on the specific internal energy of the gas.

$$\dot{m} = \frac{P}{c_v(T - T_0)} \tag{4}$$

Ambient temperature, $T_0$, is assumed to be 293.15 K throughout these calculations. The efficiency of the system is taken to be the ratio of the total exergy that enters the expander to the total exergy that left the compressor. Exergy is the amount of useful work that can be done by a system. Exergy is not a conserved quantity and is destroyed as entropy is generated. The specific exergy, ε, of an ideal gas is given by $$\varepsilon = c_v(T - T_0) - T_0\left[c_v \ln\left(\frac{T}{T_0}\right) - R\ln\left(\frac{p}{p_0}\right)\right] \tag{5}$$

Efficiency calculations assume no efficiency losses due to individual components (i.e. no energy loss from compressor, expander, heat exchanger, etc.). Calculations may be adjusted for using actual efficiencies when attempting to predict performance of a real system. The temperature of the gas exiting a heat transfer unit, $T_{out}$, is dependent on the melting temperature of the thermal energy storage stage, $T_m$, the heat exchanger efficiency, e, and the temperature of the gas entering the stage, $T_{in}$.

$$T_{out} = (1-e)T_{in} + eT_m \tag{6}$$

The heat exchange process is assumed to be isobaric, while the heat exchanger efficiencies are assumed to be 0.7. All of the heat that is lost or gained by the gas is assumed to be transferred to or from the thermal energy storage stage. Thus the rate of change of the enthalpy in the form of latent heat being stored in the thermal energy storage stage, H, is given by $$\frac{dH}{dt} = c_v r h(T_{out} - T_{in}). \tag{7}$$

The optimal melting temperatures for the thermal energy storage stages including a PCM (referred to herein as "PCM thermal energy storage stages" or "PCM stages") are determined by repeating the simulation for different stages' melting temperatures using a grid search algorithm. It was assumed that all the melting temperatures are unique, and are arranged in order of increasing PCM melting point temperature, i.e.

$$T_{m,1} < T_{m,2} < \ldots < T_{m,N} \tag{8}$$

where $T_{m,N}$ is the melting point temperature of the farthest downstream PCM and $T_{m,1}$ is the melting point temperature of the PCM positioned closest to the gas inlet connected to the output of the upstream gas compression stage.

There is a predefined maximum melting temperature and minimum melting temperature, $T_{m,max}$ and $T_{m,min}$, respectively. These are chosen such that they are expected to be sufficiently separated from the range of optimal melting temperatures. If an optimal melting temperature is found to be within one grid spacing of one of the boundaries, then the calculation is repeated using larger boundaries. The individual melting temperatures are incremented in the grid search individually by an amount $dT_1$, while pertaining to the limitations set out in Equation (8). Once the optimal efficiency value is determined by this approach, with melting temperatures $$(T_{m,1,ops1}, T_{m,2,ops1}, \ldots, T_{m,ops1}), \tag{9}$$

the result is then refined further by searching in the space $$(T_{m,1,opt1} \pm dT_1,\ T_{m,2,opt1} \pm dT_1,\ \ldots\ ,\ T_{m,opt1} \pm dT_1). \tag{10}$$

This space is then searched using a spacing $dT_2 < dT_1$. The amount of simulations, s, required to search both spaces is $$z = \binom{\left\lceil \frac{T_{max} - T_{min}}{dT_2} \right\rceil + 1}{n_{PCM}} + \left\lceil 2\frac{dT_1}{dT_2} \right\rceil^{n_{PCM}}. \tag{11}$$

Where $$\binom{x}{y}$$

represents the function x choose y, and [z] is the ceiling function of z. The minimum number of simulations required to search the space with resolution $dT_2$ given appropriate $T_{max}$ and $T_{min}$ can be determined by calculating Equation 11 to determine the optimal $dT_1$ value. A calculus approach for finding the minimum value using a derivative is not possible as the choose and ceiling functions are not differentiable. The uncertainties in melting temperatures shown in later results represent the minimum grid size, $dT_2$. As the number of thermal energy storage stages increases, the number of simulations required to maintain the same spacing increases exponentially. Additionally, $T_{max}-T_{min}$ needs to increase with the number of thermal energy storage stages. Thus, to reduce computational demand $dT_2$ is increased with increasing number of thermal energy storage stages. This has the effect of increasing uncertainty in optimal melting temperatures at higher numbers of thermal energy storage stages.

In order to allow every compression/expansion stage to have equal power, in the calculations the compression ratio is set to be equal for all stages. In the calculations, it is assumed that the gas enters every compression stage and leaves every expansion stage at atmospheric temperature. Neither of these conditions may necessarily be satisfied in various embodiments of the present system. It is assumed that the rate of change of the compression ratio per stage follows Equation (3). Given N compression stages, the compression ratio for each stage, α, is $$\alpha=\beta^{1/N}. \quad (12)$$

Thus, the maximum total compression ratio is the overall total compression achieved by all compression stages. For example, a system with three compression stages, α1, α2, and α3, has a maximum total compression ratio of α1×α2×α3. Accordingly, a system with three expansion stages with a compression ratio of 6 will have a maximum total expansion ratio of 6×6×6 (i.e., 216).

Utilizing the multiple compression/expansion stages increases the percentage of the exergy in the form of pressure, which is easier to store than thermal exergy. The relative amount of exergy in the form of temperature, $\varepsilon_T$, and pressure, $\Sigma_p$, components (see Equation (5)) can be calculated using Equations 13 and 14

$$\varepsilon_T = c_v(T-T_0) - T_0 c_v \ln\left(\frac{T}{T_0}\right) \quad (13)$$

$$\varepsilon_p = T_0 R \ln\left(\frac{p}{p_0}\right) \quad (14)$$

Figure 4:
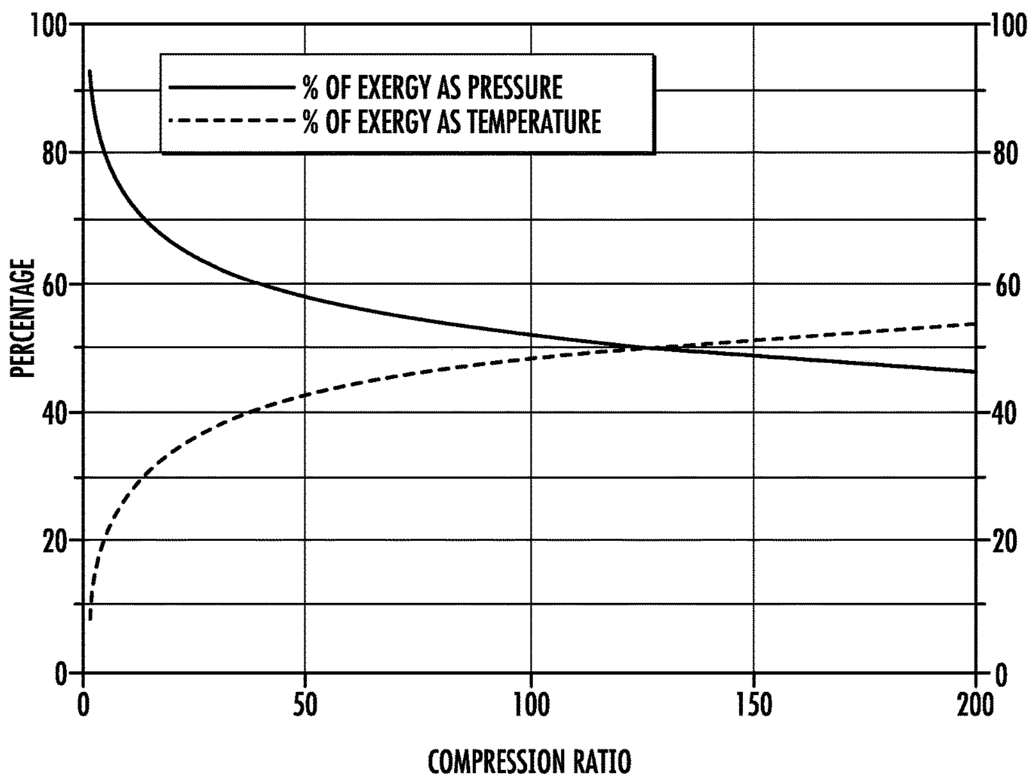
FIG. 4: is a graph illustrating exergy dependence on temperature and pressure as a function of compression ratio.

Determining temperature using Equation (1), the dependence of Equations (13) and (14) on total exergy is shown in FIG. 4. At a compression ratio of 200, the exergy components are approximately equal. However, if a 2 stage compression is used, then each stage has a compression ratio of $\sqrt{200}$ about 14, (see Equation 12) and so the exergy is approximately 70% mechanical (i.e., in the form of pressure) and only about 30% of the exergy is in the form of thermal exergy.

Figure 5:
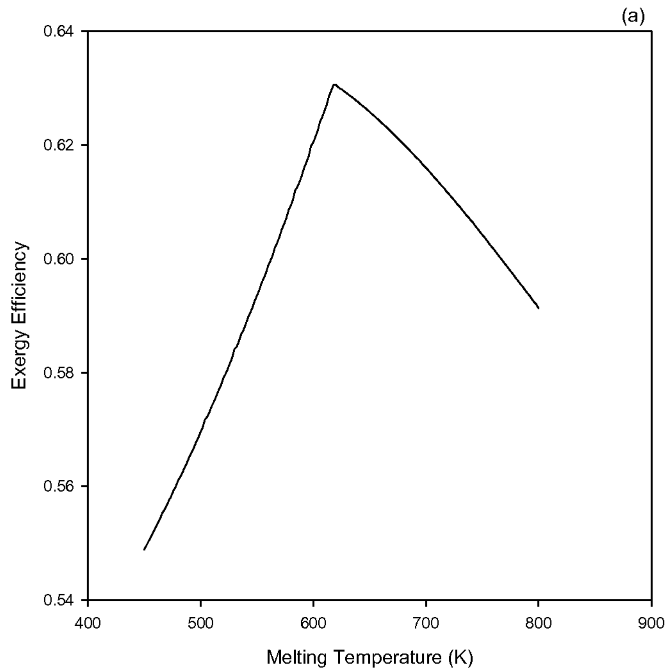
FIG. 5: are graphs showing calculated efficiencies for varying melting temperatures of a CAES system with a maximum total compression ratio of 80 for a single thermal energy storage stage system (FIG. 5(*a*)) and a two thermal energy storage stage system (FIG. 5(*b*)).
Figure 5:
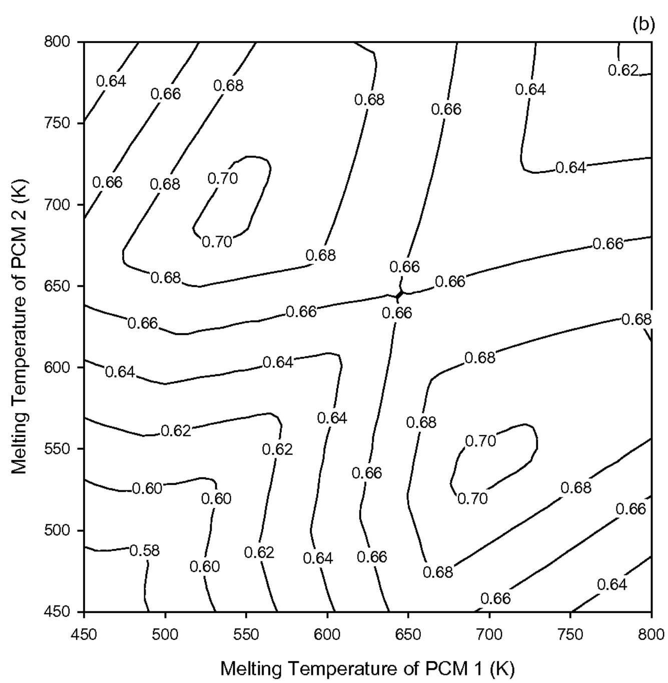

When determining system efficiencies for thermal energy storage stages with varying melting temperatures including PCM stages, the grid search consistently showed that the only local maxima for efficiency was the global maximum, as shown in FIG. 5 for the cases of one (FIG. 5(*a*)) and two (FIG. 5(*b*)) PCM stages with a maximum total compression ratio of 80. For a two PCM stage system (FIG. 5(*b*)), the melting temperature of PCM stage 1 is always less than PCM stage 2 by design, so the bottom right half of the efficiency plot for FIG. 5(*b*) is actually a reflection about the diagonal. This behavior can also be seen in systems with higher numbers of thermal energy storage stages. Accordingly, from herein the calculations and figures reporting melting temperature values are the values at the maximum efficiency point.

Figure 6:
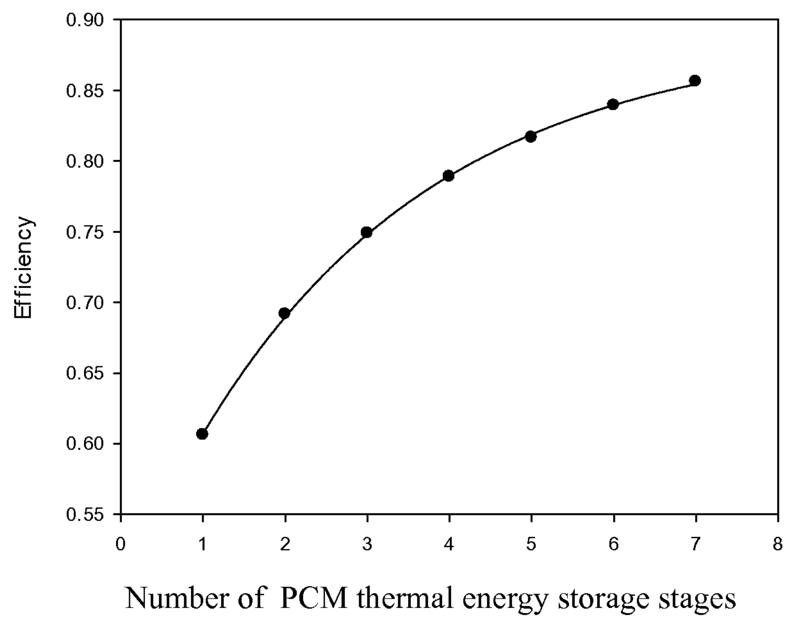
FIG. 6: shows a graph illustrating the effect of varying the number of PCM stages in a heat transfer unit on the efficiency of the system with a maximum total compression ratio of 80.

In some embodiments, as the number of thermal energy storage stages is increased, the roundtrip exergy efficiency is increased. For example, FIG. 6 demonstrates the cases of one to seven PCM stages at a maximum total compression ratio of 80. The efficiency gain is significant, with an efficiency of 60.6% for one PCM stage rising to an efficiency of 85.6% for seven PCM stages. The data was fitted with an exponential rise to maximum curve, which had an $r^2$ value of 0.9999. The curve was found to plateau at an efficiency value of 89%.

Figure 7:
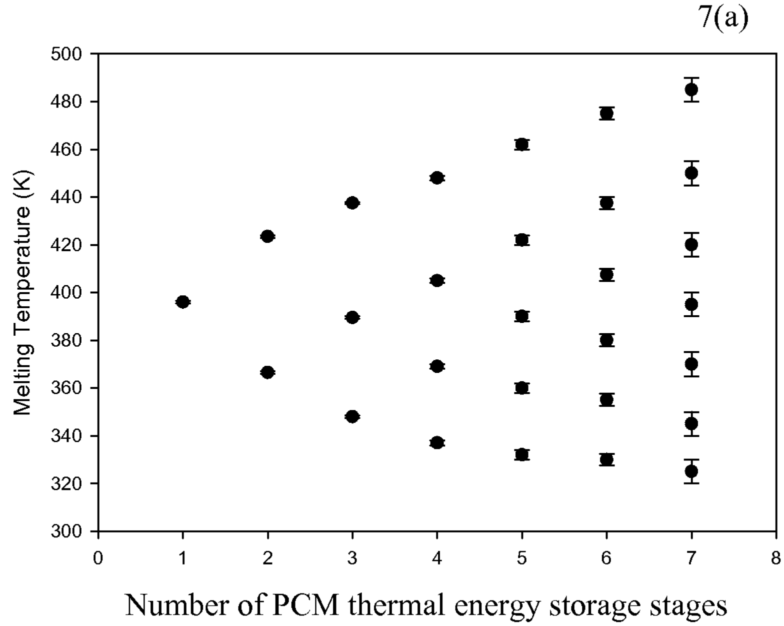
FIG. 7: is a graph illustrating the calculated optimal PCM melting temperatures for CAES systems with a maximum total compression ratio of 10 (FIG. 7(*a*)), 15 (FIG. 7(*b*)), and 80 (FIG. 7(*c*)) and varying numbers of PCM stages in the heat transfer unit, where multiple data points in each column represent all the optimal PCM melting temperatures in a system.
Figure 7:
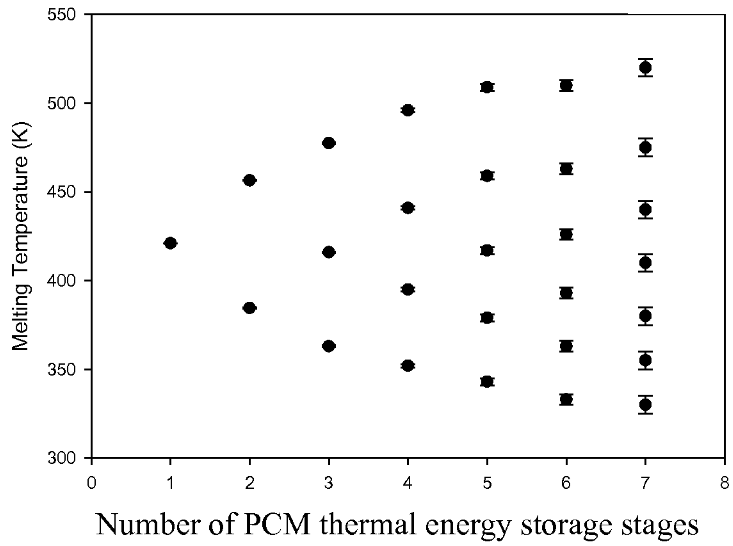
Figure 7:
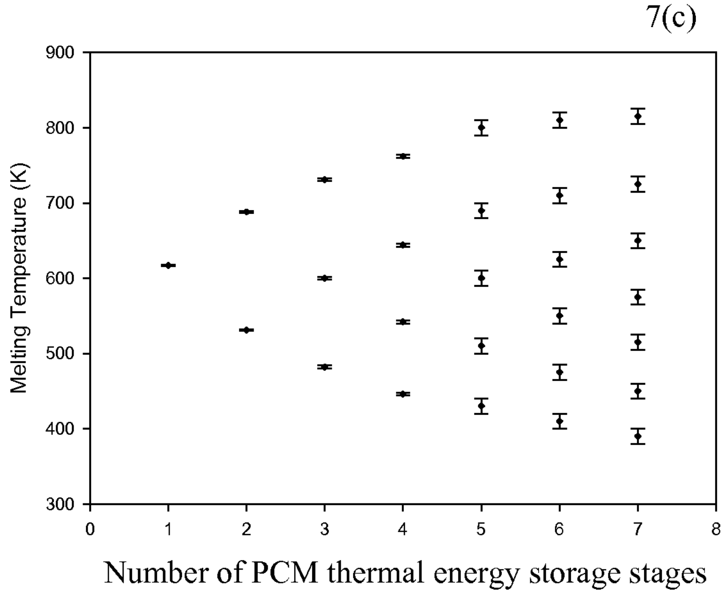

In some embodiments, as the number of thermal energy storage stages increases, not only does the efficiency increase, but the temperature span covered by the thermal energy storage stage melting temperatures increases. For example, FIG. 7 illustrates the optimal melting temperatures including the increased span covered by the PCM stages that resulted in the efficiencies of FIG. 6. FIGS. 7(*a*), 7(*b*), and 7(*c*) demonstrate the optimal melting temperature of the PCM stages at a maximum total compression ratio of 10, 15, and 80, respectively. The error bars represent the $dT_2$ step size used in the grid search algorithm. Due to increasing computational complexity with increasing number of PCM stages, the $dT_2$ step size increases as the number of PCM stages is increased. In the case of reversible adiabatic compression with a polytropic exponent of 1.45 of an ideal gas with a maximum total compression ratio of 80, the temperature increases from the ambient temperature of 293.15 K to 1142 K.

By increasing the span of melting temperatures, the thermal exergy is better conserved. This is because the heat from the gas is transferred to a thermal energy storage stage at a similar temperature, and therefore little exergy is destroyed in the process. The multiple thermal energy storage stages of the cooling process allows heat to be transferred to an energy storage with minimal exergy loss, as by design the gas temperature enters a thermal energy storage stage only slightly above its isothermal temperature. When the gas leaves the final stage, it is close to atmospheric temperature, at which point little thermal exergy remains. This system would be perfectly efficient with an infinite number of thermal energy storage stages as then the temperature range could be completely covered.

Figure 8:
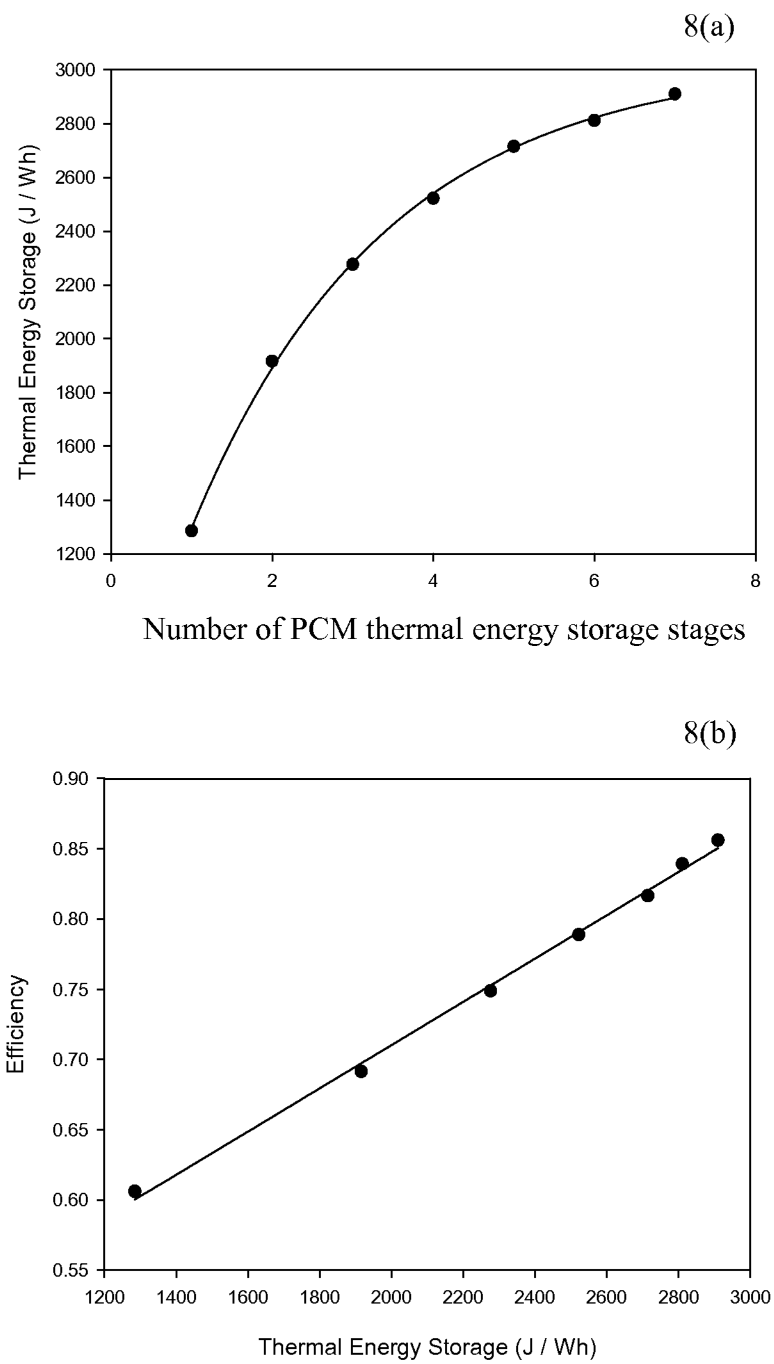
FIG. 8: is a graph illustrating the dependency of the amount of thermal energy storage required as a function of the number of PCM stages (FIG. 8(*a*)) and the efficiency of heat storage in the heat transfer unit (FIG. 8(*b*)).

The dependency of the required total amount of thermal energy storage for a multi-PCM stage system with a maximum total compression ratio of 80 is displayed in FIG. 8. The results are shown in terms of both the number of PCM stages (FIG. 8(*a*)) as well as the efficiencies (FIG. 8(*b*)). As the number of PCM stages increases, the amount of thermal energy storage also increases, and is believed to be approaching the value of $$3600\frac{J}{\mathrm{Wh}}.$$

Accordingly, every joule of compressed energy would then require a joule of thermal energy storage. Recall that energy is dependent entirely upon temperature, unlike exergy. As also shown in FIG. 8(*b*), the efficiency is linearly dependent on the amount of thermal energy storage. A linear regression was performed, with the line of best fit shown in FIG. 8(*b*), which has a slope of 1.539E-4 and a y-intercept of 0.4024, which has an $r^2$ value of 0.9969.

Figure 9:
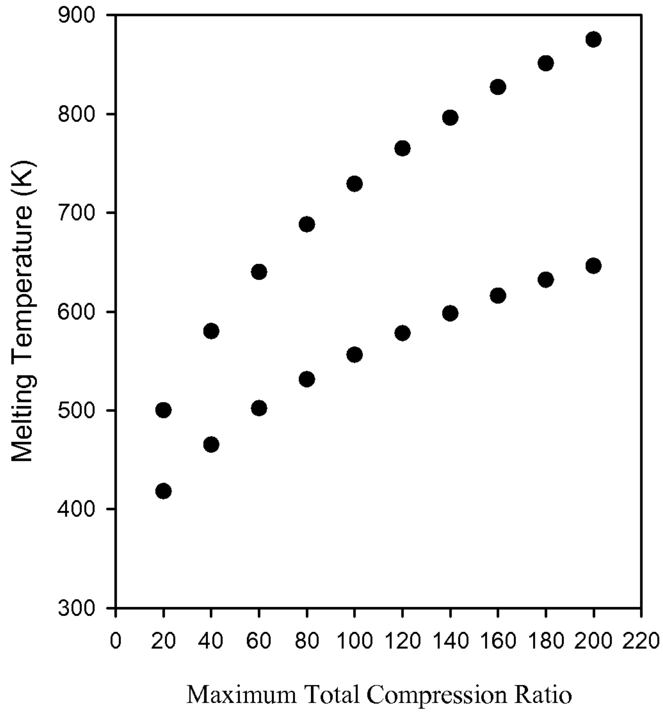
FIG. 9: is a graph illustrating the calculated optimal PCM melting temperature for a two PCM stage system as a function of the maximum total compression ratio.
Figure 10:
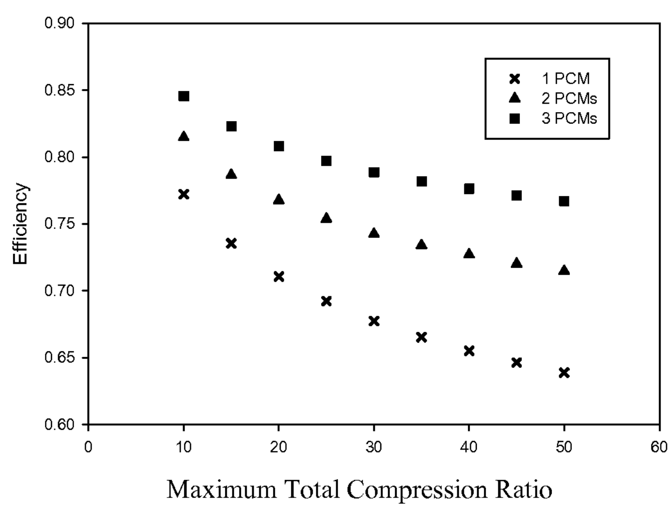
FIG. 10: is a graph illustrating the calculated optimal efficiencies as a function of maximum total compression ratio for a CAES system, which includes a single compression unit and one, two, or three PCM stages in the heat transfer unit.

As shown in FIG. 9 as the maximum total compression ratio increases, the maximum temperature of the gas leaving the compressor increases, making it more difficult for a series of PCM stages to cover the entire operating temperature range, and thus reducing optimal efficiencies. However, as the number of PCM stages increases, it becomes easier for the PCM stages to cover the calculated optimal melting temperature range and results in greater efficiency. For example, FIG. 10 illustrates systems with one, two, and three PCM stages and demonstrates that the efficiency increases as the number of PCM stages increases.

Accordingly, as the number of thermal energy storage stages increase, the stages can be employed to cover a large temperature span encountered by system with significant gains in efficiency as additional stages are added, because additional stages allow for improved coverage of the temperature range (see FIG. 7). However, as the maximum total compression ratio is increased, efficiency is reduced as maximum temperature is increased.

Figure 11:
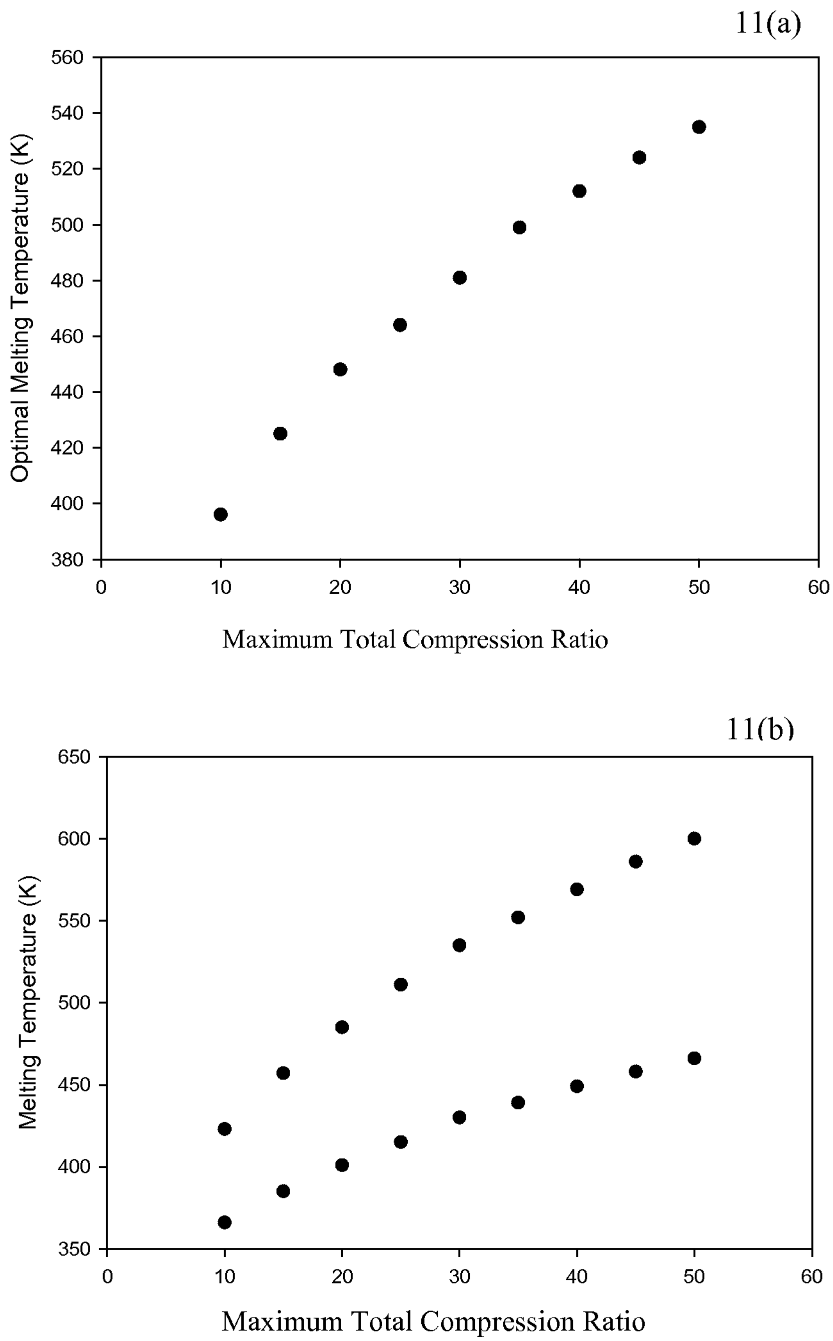
FIG. 11: is a graph illustrating the effect of varying the maximum total compression ratio on the optimal melting temperatures for a single compression stage CAES system with one PCM stage (FIG. 11(*a*)), two PCM stages (FIG. 11(*b*)), and three PCM stages (FIG. 11(*c*)).
Figure 11:
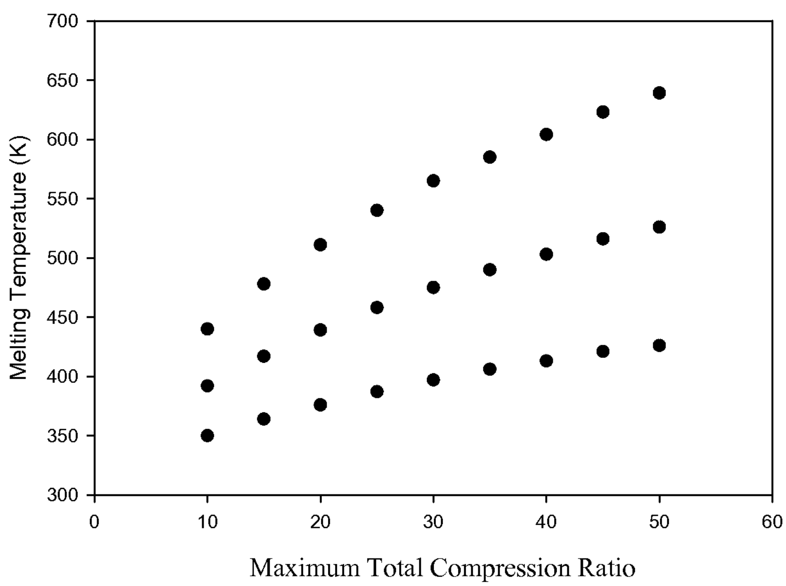

In some embodiments, it is preferred that the system include more than one compression/expansion stage, because a system with only a single compression stage requires rather high thermal energy storage stage temperatures. For example, FIG. 11 illustrates the optimal melting temperature for a single compression stage system with one PCM stage (FIG. 11(*a*)), with two PCM thermal energy storages stages (FIG. 11(*b*)), and three PCM stages (FIG. 11(*c*)). At only a compression ratio of 50, the optimal melting temperatures are above 500 K for at least one of the PCM thermal energy storages stages in the adjacent heat transfer unit. Accordingly, there may be a limited selection of materials with a likely high cost that would fit these requirements. Additionally, there may be technical issues that arise from designing compressors, expanders, and heat transfer units that can meet such high temperature requirements.

Figure 12:
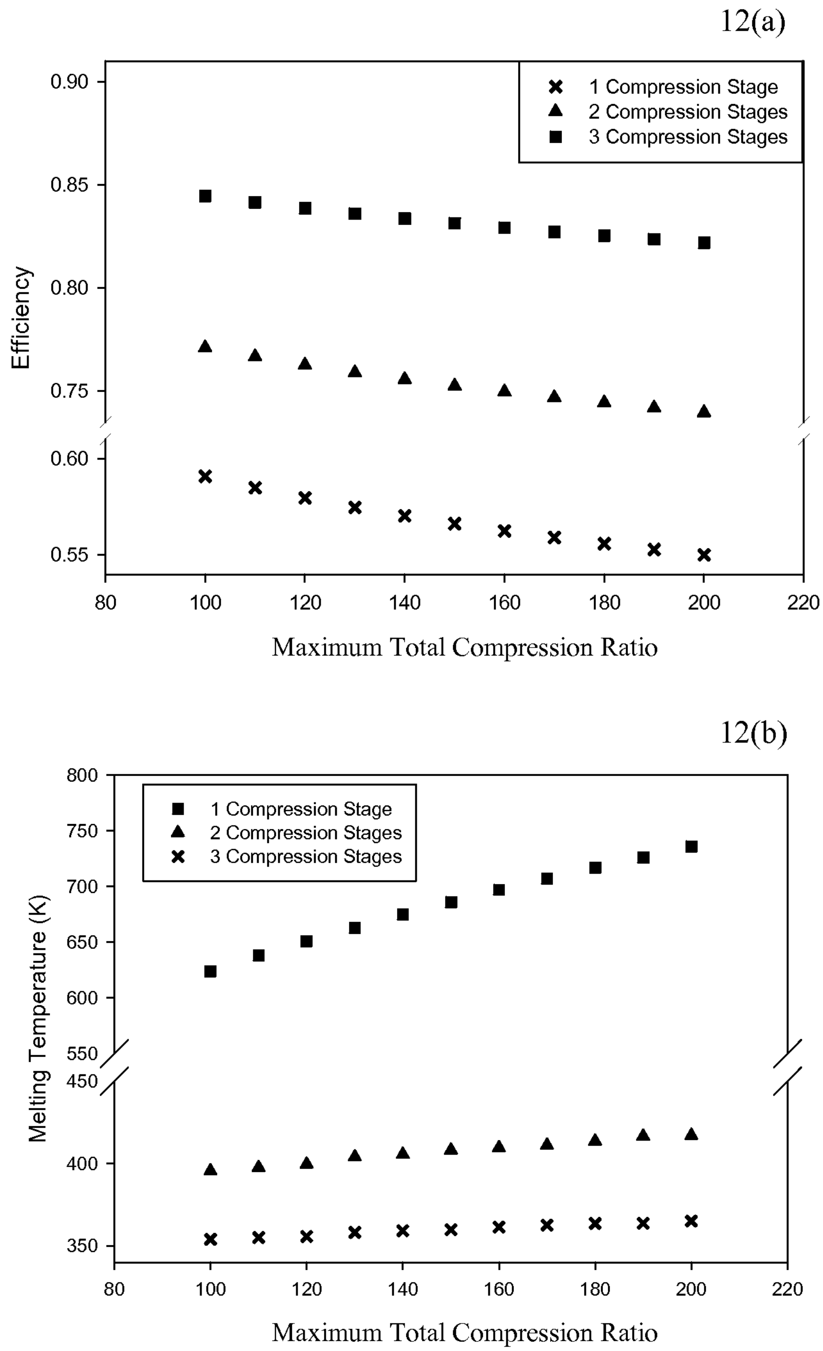
FIG. 12: are graphs illustrating calculated efficiency (FIG. 12(*a*)) and optimal melting temperature (FIG. 12(*b*)) of CAES systems with 1, 2, or 3 compression stages and heat transfer units with a single PCM stage following each compression stage.
Figure 13:
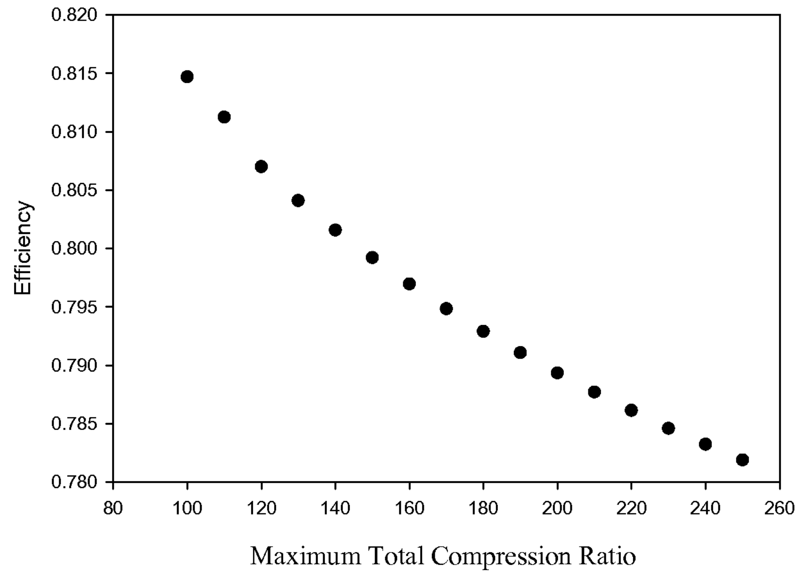
FIG. 13: are graphs illustrating calculated efficiency (FIG. 13(*a*)) and optimal melting temperature (FIG. 13(*b*)) of CAES systems with 2 compression stages and heat transfer units with two PCM stages following each compression stage.
Figure 13:
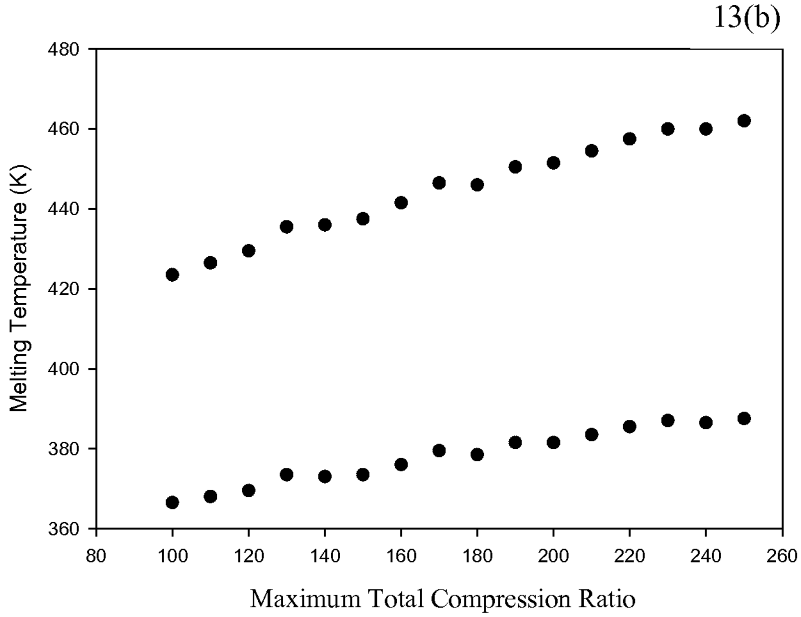
Figure 14:
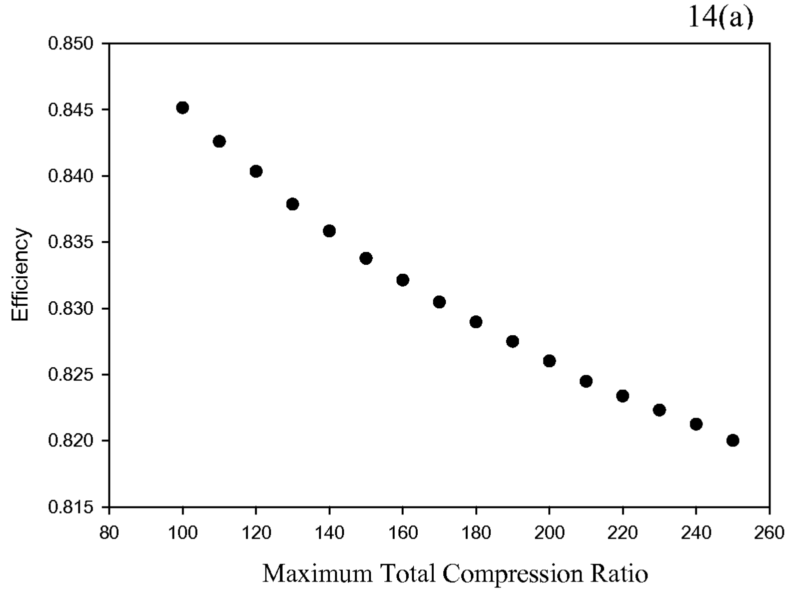
FIG. 14: are graphs illustrating calculated efficiency (FIG. 14(*a*)) and optimal melting temperature (FIG. 14(*b*)) of CAES systems with two compression stages and heat transfer units with three PCM stages following each compression stage.
Figure 14:
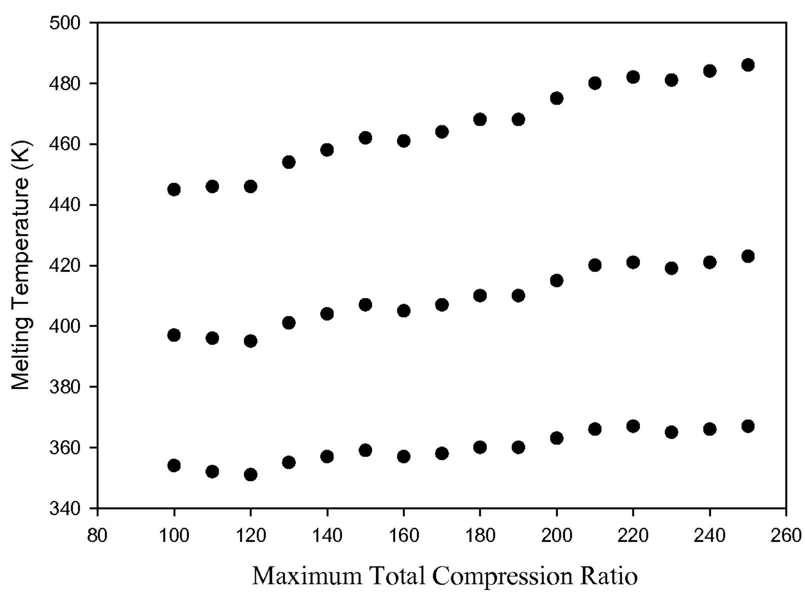
Figure 15:
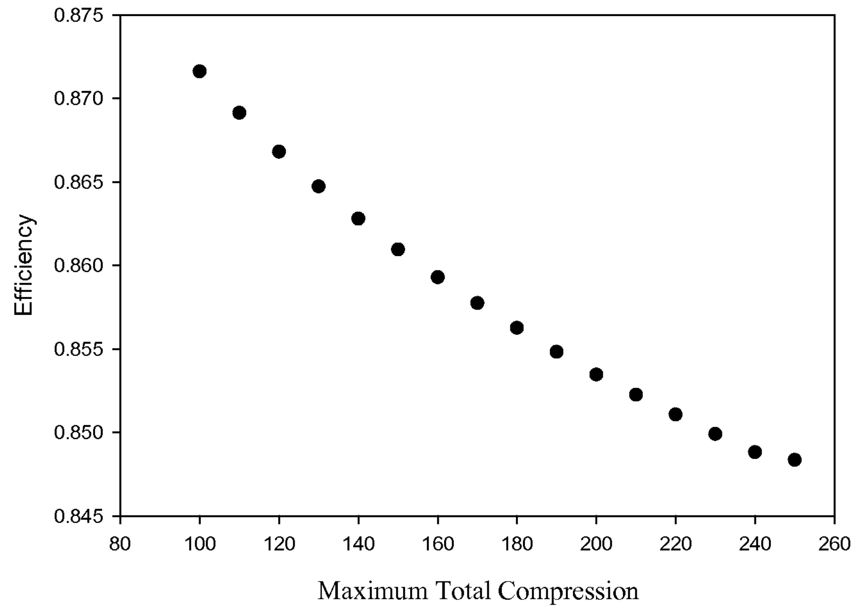
FIG. 15: are graphs illustrating calculated efficiency (FIG. 15(*a*)) and optimal melting temperature (FIG. 15(*b*)) of CAES systems with three compression stages and heat transfer units with two PCM stages following each compression stage.
Figure 15:
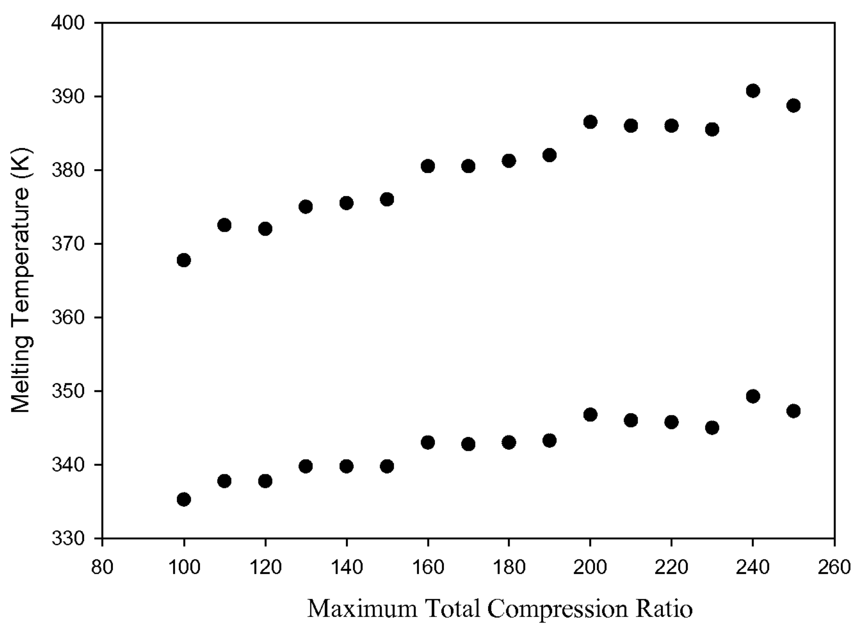
Figure 16:
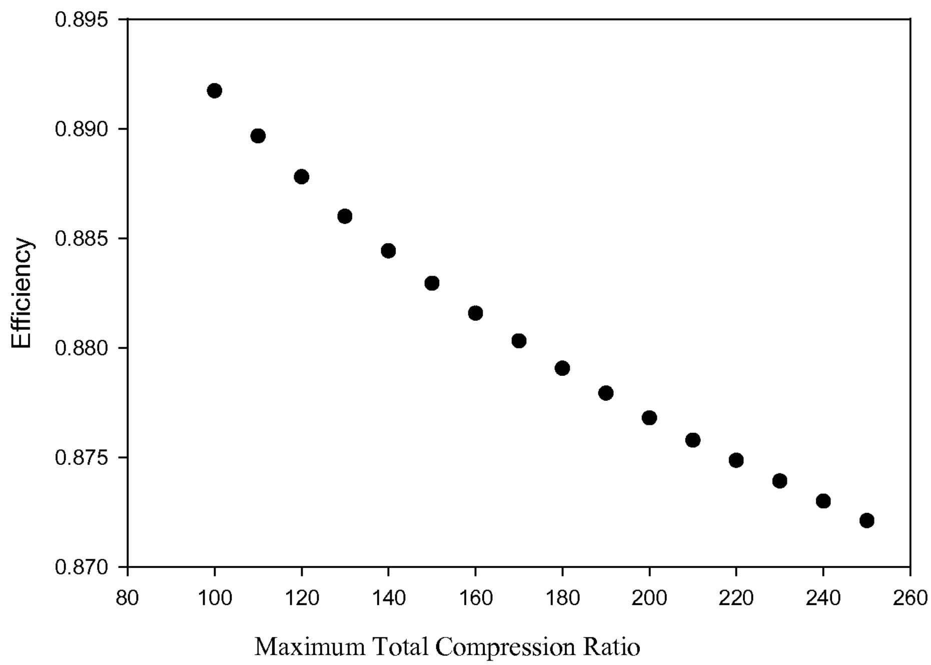
FIG. 16: are graphs illustrating calculated efficiency (FIG. 16(*a*)) and optimal melting temperature (FIG. 16(*b*)) of CAES systems with three compression stages and heat transfer units with three PCM stages following each compression stage.
Figure 16:
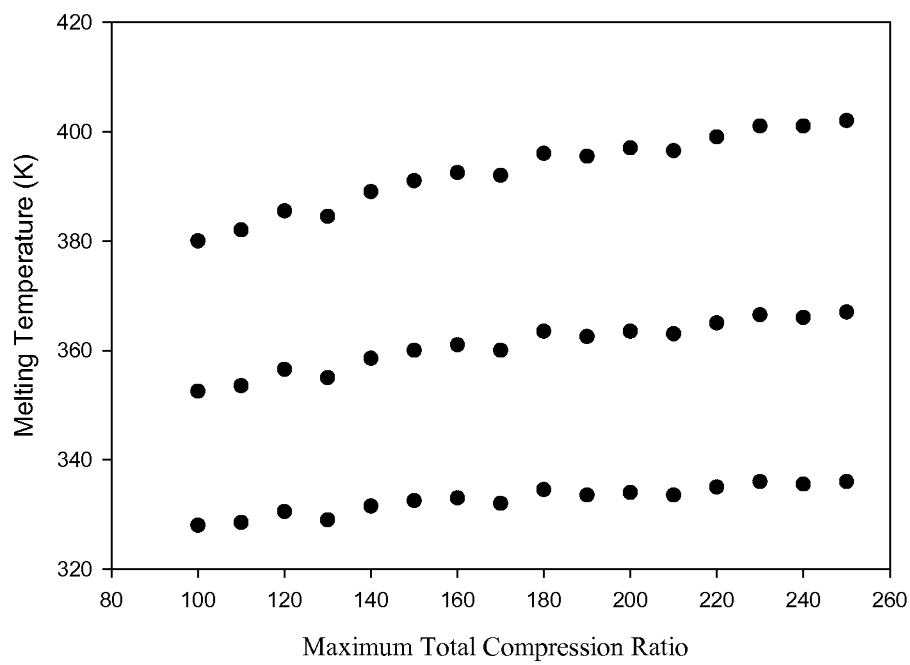

Because of the difficulties that accompany single compression stage systems, in some embodiments, the use of multi-stage compression/expansion systems may be advantageous. In another embodiment, multi-stage compression/expansion systems with at least two thermal energy storage stages may be most preferred, because significant gains in efficiency may occur as additional compression stages are introduced, and because the additional compression stages may allow the temperature that passes through the thermal energy storage stage to be significantly lower in contrast to the single compression stage approach. The greater efficiency and lower optimal temperature of the thermal energy storage stages of multi-stage compression/expansion systems is demonstrated in FIGS. 12-16. FIG. 12 illustrates the efficiency (FIG. 12(*a*)) and optimal melting temperature (FIG. 12(*b*)) for one, two, and three compression stage systems with a single PCM stage following each compression stage. FIG. 13 illustrates the efficiency (FIG. 13(*a*)) and optimal melting temperature (FIG. 13(*b*)) for a two compression stage system with two PCM stages following each compression stage. FIG. 14 illustrates the efficiency (FIG. 14(*a*)) and optimal melting temperature (FIG. 14(*b*)) for a two compression stage system with three PCM stages following each compression stage. FIG. 15 illustrates the efficiency (FIG. 15(*a*)) and optimal melting temperature (FIG. 15(*b*)) for a three compression stage system with two PCM stages following each compression stage. FIG. 16 illustrates the efficiency (FIG. 16(*a*)) and optimal melting temperature (FIG. 16(*b*)) for a three compression stage system with three PCM stages following each compression stage. As can be seen in FIGS. 12-16, significant gains in efficiency are shown as additional compression stages are introduced. Moreover, the additional compression stages allow the temperature of the compressed gas that passes through the PCM stage to be lower in contrast to the single compression stage approach.

Achieving these lower optimal melting temperatures, notably those obtained for the systems with two or three compression stages, is significant as it dramatically changes the requirements for the type of materials that may be used. Specifically, there are significantly more materials that could be used as for a system with three compression stages and two or three thermal energy storage stages, because the optimal temperature for the thermal energy storage stages are in the range of ≤400 K (i.e., ~127° C.).

Illustrative Embodiments

A compressed gas energy storage system, which includes serially linked in fluid communication: a first compression stage (C-1); a first heat transfer unit (HTU-1), and a compressed storage reservoir, is provided herein. The HTU-1 includes at least two thermal energy storage stages (TESs). Each of the TESs may have a thermal energy transfer temperature (TETT) which is lower than a TETT of an adjacent upstream TES of the HTU-1. The system may also include a first expansion stage (T-1) in fluid communication with the HTU-1. The first expansion stage may include a gas turbine.

The TESs of the system may include a phase change material (PCM) in thermal contact with a fluid conduit passing through the TES; and the fluid conduit may be in fluid communication with a gas inlet and a gas outlet of the HTU-1.

Commonly, the system may include a second compression stage (C-2) and second heat transfer unit (HTU-2) serially linked in fluid communication between the HTU-1 and the gas storage reservoir. The HTU-2 may be positioned between the second compression stage and the gas storage reservoir. The system may include a second expansion stage in fluid communication with the HTU-2 and HTU-1.

In some embodiments, the HTU-1 and HTU-2 may be the same heat transfer unit. In other embodiments, the HTU-1 and HTU-2 may be different heat transfer units.

The system may also include serially linked in fluid communication between the HTU-1 and the gas storage reservoir: a second compression stage (C-2); a second heat transfer unit (HTU-2); a third compression stage (C-3); and a third heat transfer unit (HTU-3). The second expansion stage may be in fluid communication with the HTU-2 and the HTU-1 and the third expansion stage may be in fluid communication with the HTU-3 and the HTU-2.

In many instances, the first compression stage (C-1) is in fluid communication with a gas inlet of the first heat transfer unit (HTU-1); and the gas storage reservoir (GSR) is in fluid communication with a gas outlet of the HTU-1. Each of the thermal energy storage stages may include a PCM. Each PCM of the thermal energy storage stages may have a melting point which is lower than a melting point of the PCM in an adjacent upstream TES of the HTU-1.

In some embodiments, the system includes sequentially positioned in fluid communication between the first heat transfer unit (HTU-1) and the gas storage reservoir (GSR): a second compression stage (C-2); a second heat transfer unit (HTU-2) including at least one PCM stage; a third compression stage (C-3); and a third heat transfer unit (HTU-3) including at least one PCM stage. The HTU-1, HTU-2, and HTU-3 may each include at least two PCM stages. In turn, each of the PCM stages may include at least one phase transfer material (PCM) having a melting point which is lower than a melting point of a PCM in an adjacent upstream PCM stage. In some instances, the system may include a sensible heat transfer unit positioned in fluid communication between the third heat transfer unit (HTU-3) and the gas storage reservoir.

The system may also include a first expansion stage (T-1) positioned in fluid communication with the first heat transfer unit (HTU-1); a second expansion stage (T-2) positioned in fluid communication between the second heat transfer unit (HTU-2) and the first heat transfer unit (HTU-1); and a third expansion stage (T-3) positioned in fluid communication between the third heat transfer unit (HTU-3) and the second heat transfer unit (HTU-2).

In some embodiments, the system may include at least two compression stages and at least two HTUs each including at least two TESs consisting of an upstream TES and a downstream TES serially linked in fluid communication between a gas inlet and gas outlet of the HTU-1. The system may have a maximum total compression of about 50 to about 250. Each of the compression stages may have a compression ratio of about 3 to 20, about 5 to 15 and more commonly about 8 to 15 or 10-14. In some embodiments, the first compression stage may have a compression ratio of about 8 to 15; and the upstream TES may include a PCM having a melting point of about 410 to 460 K; and the downstream TES may include a PCM having a melting point of about 360 to 390 K.

In some embodiments, the system may include at least three compression stages and at least three HTUs each including at least two TESs consisting of an upstream TES and a downstream TES serially linked in fluid communication between a gas inlet and gas outlet of the HTU-1. The system may have a maximum total compression of about 50 to about 250. Each of the compression stages may have a compression ratio of about 3 to 20, about 3 to 10 and more commonly about 4 to 7 or 5-6. In some embodiments, the first compression stage may have a compression ratio of about 4 to 7; and the upstream TES may include a PCM having a melting point of about 360 to 390 K; and the downstream TES may include a PCM having a melting point of about 330 to 350 K.

In some embodiments, the system may include at least two compression stages and at least two HTUs each including at least two TESs consisting of an upstream TES and a downstream TES serially linked in fluid communication between a gas inlet and gas outlet of the HTU-1. The system may have a maximum total compression of about 50 to about 250. Each of the compression stages may have a compression ratio of about 3 to 20, about 5 to 15 and more commonly about 8 to 15 or 10-14. In some embodiments, the first compression stage may have a compression ratio of about 8 to 15; and the upstream TES may include a PCM having a melting point of about 430 to 490 K; the midstream TES may include a PCM having a melting point of about 390 to 420 K; and the downstream TES may include a PCM having a melting point of about 340 to 370 K.

In some embodiments, the system may include at least three compression stages and at least three HTUs each including at least three TESs consisting of an upstream TES and a downstream TES serially linked in fluid communication between a gas inlet and gas outlet of the HTU-1. The system may have a maximum total compression of about 50 to about 250. Each of the compression stages may have a compression ratio of about 3 to 20, about 3 to 10 and more commonly about 4 to 7 or 5-6. In some embodiments, the first compression stage may have a compression ratio of about 4 to 7; and the upstream TES may include a PCM having a melting point of about 375 to 410 K; the midstream TES may include a PCM having a melting point of about 345 to 370 K; and the downstream TES may include a PCM having a melting point of about 310 to 340 K.

Also provided herein is a compressed gas energy storage system including: a first compression stage (C-1) having an outlet in fluid communication with a first gas inlet of a first heat transfer unit (HTU-1); a second compression stage (C-2) having an inlet in fluid communication with a first gas outlet of the HTU-1 and an outlet in fluid communication with a second gas inlet of the HTU-1; and a gas storage reservoir (GSR) in fluid communication with a second gas outlet of the HTU-1. The first gas inlet and the first gas outlet of the HTU-1 may be connected by a first fluid conduit; and the second gas inlet and the second gas outlet of the HTU-1 may be connected by a second fluid conduit.

In some embodiments, the heat transfer unit includes at least one thermal energy storage stage which includes a phase change material (i.e., PCM stage). The PCM may be in thermal contact with the first and second fluid conduits. The heat transfer unit may include at least two PCM stages. Each of the PCM stages may include a phase transfer material (PCM) having a melting point which is lower than a melting point of the PCM in an adjacent upstream PCM stage.

A compressed gas energy storage system including sequentially positioned in fluid communication: a first compression stage (C-1); a first heat transfer unit (HTU-1) comprising at least one PCM stage; a second compression stage (C-2); a second heat transfer unit (HTU-2) comprising at least one PCM stage; and a gas storage reservoir (GSR), is provided herein. In some embodiments, the system may include a first expansion stage (T-1) positioned in fluid communication with the first heat transfer unit (HTU-1); and a second expansion stage (T-2) positioned in fluid communication with the first heat transfer unit (HTU-1) and the second heat transfer unit (HTU-2).

Also provided herein is a method of storing compressed gas energy including: (a) compressing a gas through a first compression stage (C-1) to produce a first compressed gas; (b) passing the first compressed gas through a first heat transfer unit (HTU-1) to produce a first heat removed gas; and (c) transferring the first heat removed gas to a gas storage reservoir (GSR) to produce a stored gas. The HTU-1 may include at least two thermal energy storage stages (TESs) serially linked in fluid communication between a gas inlet and a gas outlet of the HTU-1. Each of the TESs may have a thermal energy transfer temperature (TETT) which is lower than a TETT of an adjacent upstream TES of the HTU-1. In some embodiments, passing the first compressed gas through the HTU-1 in step (b) includes sequentially passing the first compressed gas through the at least two TESs. Transferring the first heat removed gas to the GSR in step (c) may include compressing the first heat removed gas through a second compression stage (C-2) to produce a second compressed gas; and passing the second compressed gas through a second heat transfer unit (HTU-2) to produce a second heat removed gas, which is transferred to the GSR.

The method may also include: (d) passing the stored gas from the GSR through the first heat transfer unit (HTU-1) to produce a first heat added gas; and (e) expanding the first heat added gas through a first expansion stage (T-1) to produce a first expanded gas. In some embodiments, passing the first expanded gas through the HTU-1 includes sequentially passing the first expanded gas through the at least two TESs in a direction which is the reverse of the passage of the first compressed gas in step (b). In some embodiments, the first expansion stage may include a gas turbine.

In some embodiments of the method, the HTU-1 and HTU-2 are the same heat transfer unit. In other embodiments, the HTU-1 and HTU-2 are different heat transfer units. The HTU-2 may include at least two thermal energy storage stages (TESs) serially linked in fluid communication between a gas inlet and a gas outlet of the HTU-2. Each of the TESs in the HTU-2 may have a thermal energy transfer temperature (TETT), which is lower than a TETT of an adjacent upstream TES of the HTU-2. In some embodiments, at least one of the TESs includes a phase change material (PCM) in thermal contact with a fluid conduit passing through the TES (PCM-TES). The fluid conduit may be in fluid communication with the gas inlet and gas outlet of the heat transfer unit including the PCM-TES. In some embodiments, the phase change material may be suspended in a heat transfer fluid.

The method may also include prior to passing the gas stored in the GSR through the HTU-1, passing the stored gas through the HTU-2 to produce a second expanded gas; and expanding the second heat expanded gas through a second expansion stage (T-2) to produce a second expanded gas, which is transferred to the HTU-1. The transferring step (c) may also include compressing the second heat removed gas through a third compression stage (C-3) to produce a third compressed gas; and passing the third compressed gas through a third heat transfer unit (HTU-3) to produce a third heat removed gas, which is transferred to the GSR. In some embodiments, the method may also include prior to passing the stored gas through the HTU-2, passing the stored gas through the HTU-3 to produce a third expanded gas; and expanding the third expanded gas through the third expansion stage (T-3) to produce a third expanded gas, which is transferred to the HTU-2. The HTU-3 may include a one or more TESs that may include one or more sensible heat storage units.

One embodiment provided herein is a method of storing compressed gas energy including: (a) compressing a gas through a first compression stage (C-1) to produce a first compressed gas; (b) passing the first compressed gas through a first heat transfer unit (HTU-1) to produce a first heat removed gas; (c) compressing the first heat removed gas through a second compression stage (C-2) to produce a second compressed gas; (d) passing the second compressed gas through a second heat transfer unit (HTU-2) to produce a second heat removed gas; and (e) transferring the second heat removed gas to a gas storage reservoir (GSR) to produce a stored gas. Each of the heat transfer units may include at least one PCM stage, where the PCM in thermal contact with a fluid conduit passing through the heat transfer unit.

Another embodiment of the present system includes a method of storing compressed gas energy which includes (a) compressing a gas through a first compression stage (C-1) to produce a first compressed gas; (b) passing the first compressed gas through a first heat transfer unit (HTU-1) to produce a first heat removed gas; (c) compressing the first heat removed gas through a second compression stage (C-2) to produce a second compressed gas; (d) passing the second compressed gas through the first heat transfer unit (HTU-1) to produce a second heat removed gas; and (e) transferring the second heat removed gas to a gas storage reservoir (GSR) to produce a stored gas.

While certain embodiments have been illustrated and described, it should be understood that changes and modifications can be made therein in accordance with ordinary skill in the art without departing from the technology in its broader aspects.

The embodiments, illustratively described herein may suitably be practiced in the absence of any element or elements, limitation or limitations, not specifically disclosed herein. Thus, for example, the terms "comprising," "including," "containing," shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof.

What is claimed is:

1. A compressed gas energy storage system comprising:
- a first compression stage (C-1);
- a first fluid conduit serially linked in fluid communication with the C-1, the first fluid conduit passing through a first heat transfer unit (HTU-1), the HTU-1 comprising at least two thermal energy storage stages (TESs), each of the TESs having a thermal energy transfer temperature (TETT) which is lower than a TETT of an adjacent upstream TES of the HTU-1;
- a second compression stage (C-2) serially linked in fluid communication with the HTU-1 for compressing gas exiting the HTU-1 via the first fluid conduit;
- a second fluid conduit serially linked in fluid communication with the C-2, the second fluid conduit passing through the HTU-1; and
- a gas storage reservoir (GSR) serially linked in fluid communication with the HTU-1 for receiving gas exiting the HTU-1 via the second fluid conduit;
- wherein each of the TESs comprise a phase change material (PCM) in thermal contact with the first and second fluid conduit passing through the HTU-1; and the PCM in each TES has a melting point which is lower than a melting point of the PCM in an adjacent upstream TES; and upstream refers to the TES closer to the first compression stage in a fluid path connecting the first compression stage with the GSR.

2. The system of claim 1 further comprising a first expansion stage (T-1) in fluid communication with a third fluid conduit passing through the HTU-1.

3. The system of claim 2 wherein the first expansion stage comprises a gas turbine.

4. The system of claim 1 wherein the first fluid conduit is in fluid communication with a gas inlet and a gas outlet of the HTU-1.

5. The system of claim 2 further comprising a second expansion stage (T-2) in fluid communication with a fourth fluid conduit passing through the HTU-1 and the third fluid conduit passing through the HTU-1.

6. The system of claim 2 further comprising serially linked in fluid communication between the second fluid conduit passing through the HTU-1 and the gas storage reservoir: a third compression stage (C-3) and a second heat transfer unit (HTU-2).

7. The system of claim 1 wherein the first compression stage (C-1) is in fluid communication with the first fluid conduit passing through the HTU-1 via a gas inlet of the first heat transfer unit (HTU-1); and the gas storage reservoir (GSR) is in fluid communication with the second fluid conduit passing through the HTU-1 via a gas outlet of the HTU-1.

8. The system of claim 1 further comprising sequentially positioned in fluid communication between the second fluid conduit passing through the HTU-1 and the gas storage reservoir (GSR):
- a third compression stage (C-3); and
- a second heat transfer unit (HTU-2) comprising at least one PCM.

9. The system of claim 8 further comprising a sensible heat transfer unit positioned in fluid communication between the second heat transfer unit (HTU-2) and the gas storage reservoir.

10. The system of claim 8 wherein the HTU-2 comprises at least two TESs; and each of the TESs comprising a phase transfer material (PCM) having a melting point which is lower than a melting point of the PCM in the adjacent upstream TES in the HTU-2.

11. The system of claim 8 further comprising a first expansion stage (T-1) positioned in fluid communication with a third fluid conduit passing through the first heat transfer unit (HTU-1); a second expansion stage (T-2) positioned in fluid communication between a fourth fluid conduit passing through the first heat transfer unit (HTU-1) and the third fluid conduit passing through first heat transfer unit (HTU-1); and a third expansion stage (T-3) positioned in fluid communication between the second heat transfer unit (HTU-2) and the first heat transfer unit (HTU-1).

12. The system of claim 4 wherein the at least two TESs consist of an upstream TES and a downstream TES serially linked in fluid communication between the gas inlet and the gas outlet of the HTU-1; and
- the first compression stage has a compression factor of about 8 to 15; the upstream TES comprises a PCM having a melting point of about 410 to 460° K; and the downstream TES comprises a PCM having a melting point of about 360 to 390° K.

13. The system of claim 4 wherein the at least two TESs consist of an upstream TES and a downstream TES serially linked in fluid communication between the gas inlet and the gas outlet of the HTU-1; and
- the first compression stage has a compression factor of about 4 to 7; the upstream TES comprises a PCM having a melting point of about 360 to 390° K; and the downstream TES comprises a PCM having a melting point of about 330 to 350° K.

14. The system of claim 4 wherein the at least two TESs consist of an upstream TES, a midstream TES, and a downstream TES serially linked in fluid communication between the gas inlet and the gas outlet of the HTU-1; and
- the first compression stage has a compression factor of about 8 to 15; the upstream TES comprises a PCM having a melting point of about 430 to 480° K; the midstream TES comprises a PCM having a melting point of about 390 to 420° K; and the downstream TES comprises a PCM having a melting point of about 340 to 370° K.

15. The system of claim 4 wherein the at least two TESs consist of an upstream TES, a midstream TES, and a downstream TES serially linked in fluid communication between the gas inlet and the gas outlet of the HTU-1; and
- the first compression stage has a compression factor of about 4 to 7; the upstream TES comprises a PCM having a melting point of about 375 to 405° K; the midstream TES comprises a PCM having a melting point of about 345 to 365° K; and the downstream TES comprises a PCM having a melting point of about 320 to 335° K.

16. The system of claim 1 wherein the gas storage reservoir is a compressed gas storage reservoir or a liquefied gas storage reservoir.

17. A method of storing compressed gas energy comprising:
- (a) compressing a gas through a first compression stage (C-1) to produce a first compressed gas;
- (b) passing the first compressed gas through a first heat transfer unit (HTU-1) to produce a first heat removed gas;
- (c) compressing the first heat removed gas through a second compression stage (C-2) to produce a second compressed gas;
- (d) passing the second compressed gas through the HTU-1 to produce a second heat removed gas; and
- (e) transferring the second heat removed gas to a gas storage reservoir (GSR) to provide a stored compressed gas;

wherein:
- the HTU-1 comprises at least two thermal energy storage stages (TESs) serially linked in fluid communication between a gas inlet and a gas outlet of the HTU-1;
- passing the first compressed gas through the HTU-1 in step (b) comprises sequentially passing the first compressed gas through the at least two TESs;
- passing the second compressed gas through the HTU-1 in step (d) comprises sequentially passing the second compressed gas through the at least two TESs; and
- each of the TESs comprise a phase change material (PCM) in thermal contact with a fluid conduit passing through the TES; and the PCM in each TES has a melting point which is lower than a melting point of the PCM in an adjacent upstream TES of the HTU-1.

18. The method of claim 17 further comprising:
- (f) passing the stored compressed gas from the GSR through the HTU-1 to produce a first heat added gas; and
- (g) expanding the first heat added gas through a first expansion stage (T-1) to produce a first expanded gas;

wherein passing the first expanded gas through the HTU-1 comprises sequentially passing the first expanded gas through the at least two TESs in a direction which is the reverse of the passage of the first compressed gas in step (b).

19. A compressed air energy storage (CAES) system comprising:

a first compression stage (C-1) having an outlet in fluid communication with a first gas inlet of a first heat transfer unit (HTU-1);

a second compression stage (C-2) having an inlet in fluid communication with a first gas outlet of the HTU-1 and an outlet in fluid communication with a second gas inlet of the HTU-1; and a gas storage reservoir in fluid communication with a second gas outlet of the HTU-1;

wherein the HTU-1 comprises a first fluid conduit passing therethrough in fluid communication between the first gas inlet and the first gas outlet and a second fluid conduit passing therethrough in fluid communication between the second gas inlet and the second gas outlet; and the HTU-1 comprises at least two TESs, each TES having the first and second fluid conduits passing therethrough and comprising a PCM in thermal contact with the first and second fluid conduits; and the PCM in each TES has a melting point which is lower than a melting point of the PCM in the adjacent upstream TES.

20. The system of claim 1 further comprising a sensible heat transfer unit positioned in fluid communication between the second fluid conduit passing through the HTU-1 and the gas storage reservoir.

* * * * *